United States Patent
Shoda

(10) Patent No.: US 11,425,301 B2
(45) Date of Patent: Aug. 23, 2022

(54) IMAGE PROCESSING APPARATUS, INFORMATION PROCESSING APPARATUS, IMAGE PROCESSING METHOD, AND INFORMATION PROCESSING METHOD

(71) Applicant: CANON KABUSHIKI KAISHA, Tokyo (JP)

(72) Inventor: Satoshi Shoda, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/167,627

(22) Filed: Feb. 4, 2021

(65) Prior Publication Data

US 2021/0250497 A1    Aug. 12, 2021

(30) Foreign Application Priority Data

Feb. 6, 2020  (JP) .............................. JP2020-019132

(51) Int. Cl.
*H04N 5/232*    (2006.01)
*H04N 1/00*    (2006.01)
*H04N 1/32*    (2006.01)
*H04N 101/00*  (2006.01)

(52) U.S. Cl.
CPC ..... *H04N 5/23229* (2013.01); *H04N 1/00209* (2013.01); *H04N 1/32545* (2013.01); *H04N 5/232939* (2018.08); *H04N 5/232945* (2018.08); *H04N 2101/00* (2013.01); *H04N 2201/001* (2013.01); *H04N 2201/0084* (2013.01)

(58) Field of Classification Search
CPC ........... H04N 1/00209; H04N 1/00167; H04N 1/32545; H04N 5/23229; H04N 5/232939; H04N 5/232945; H04N 2101/00; H04N 2201/001; H04N 2201/0084

See application file for complete search history.

(56) References Cited

U.S. PATENT DOCUMENTS

| | | | |
|---|---|---|---|
| 2007/0030357 A1* | 2/2007 | Levien | G06T 1/0007 348/211.14 |
| 2014/0139689 A1* | 5/2014 | Georgis | H04N 5/23264 348/207.1 |
| 2019/0268536 A1* | 8/2019 | Han | H04N 1/00244 |
| 2021/0127020 A1* | 4/2021 | Yang | H04N 5/2355 |

FOREIGN PATENT DOCUMENTS

JP    2008236396 A    10/2008

* cited by examiner

*Primary Examiner* — Daniel M Pasiewicz
(74) *Attorney, Agent, or Firm* — Rossi, Kimms & McDowell LLP

(57) ABSTRACT

An image processing apparatus obtains image data and transmits the image data to an external apparatus. The image processing apparatus applies first image processing to the image data and receives a result of second image processing applied in the external apparatus to a part of the image data corresponding to a partial area of an entire image represented by the image data, prior to receiving a result of the second image processing applied in the external apparatus to the entirety of the image data corresponding to the entire image. The image processing apparatus, when causing a display apparatus to display the image data that has been transmitted to the external apparatus, causes the display apparatus to display the image data along with an indicator indicating a status of the second image processing being applied to the image data in the external apparatus.

14 Claims, 18 Drawing Sheets

1071

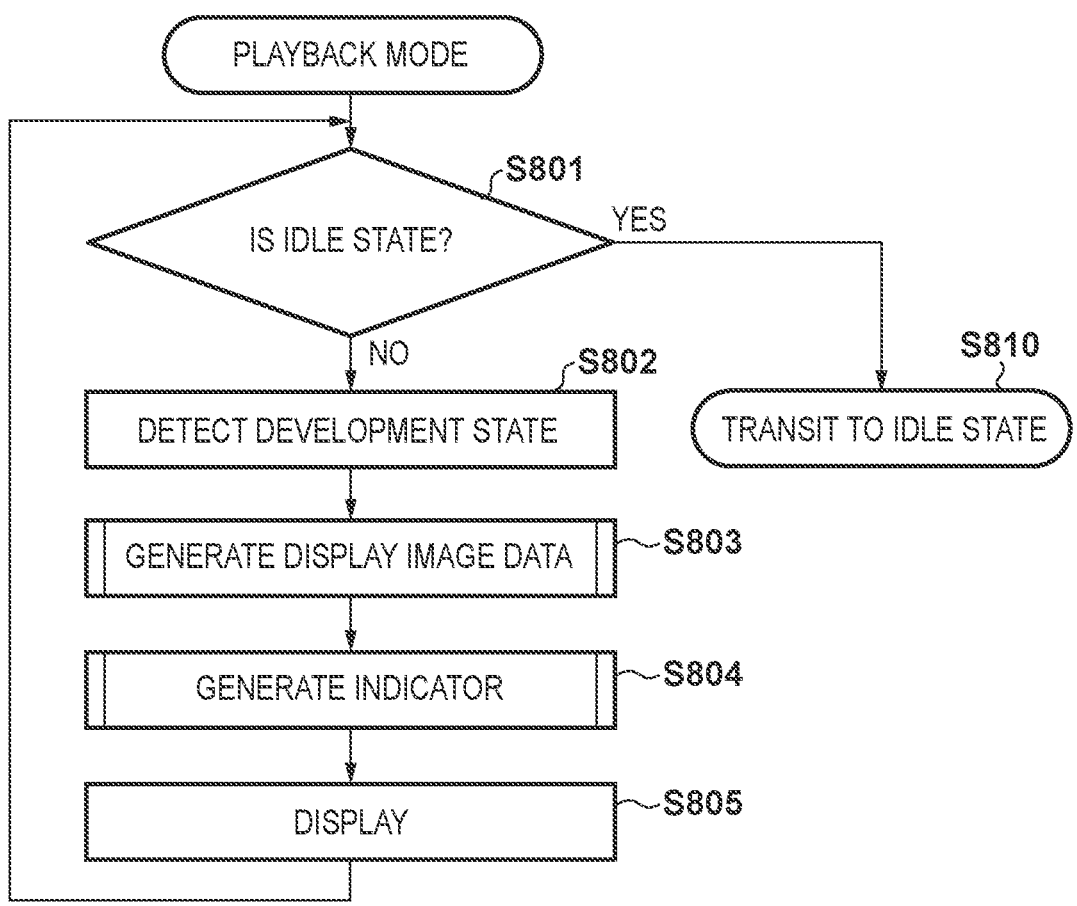

FIG. 12
| DEVELOPMENT STATE | DISPLAY FORM OF INDICATOR |
|---|---|
| UNDEVELOPED | ENTIRE:DARK |
| DEVELOPING | PARTIAL AREA:BLINK |
| PARTIALLY DEVELOPED | PARTIAL AREA:BRIGHT OTHERS:DARK |
| TOTALLY DEVELOPED | NO DISPLAY |
UNDEVELOPED
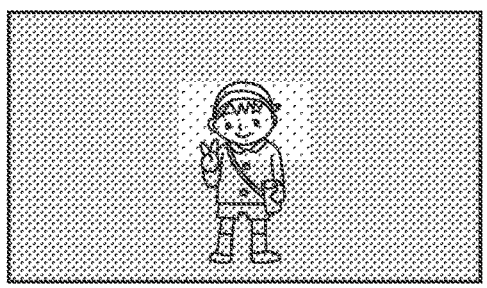
DEVELOPING
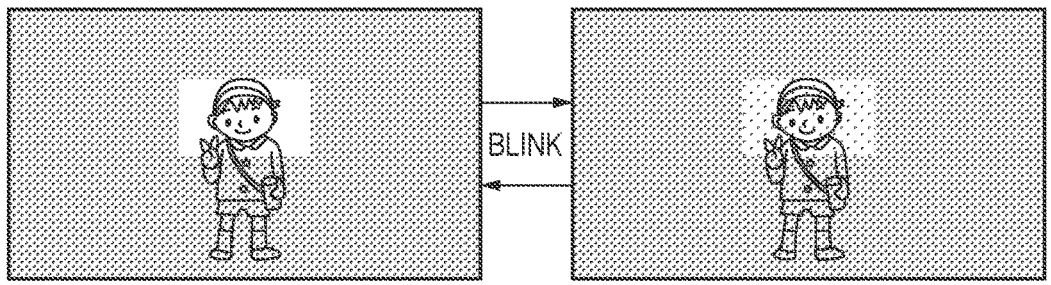
PARTIALLY DEVELOPED
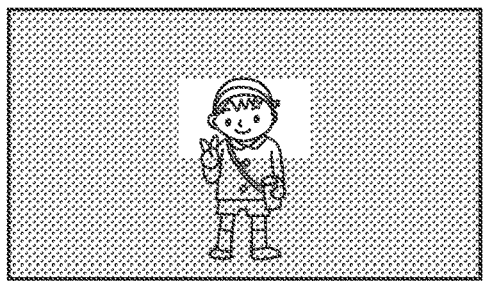
TOTALLY DEVELOPED
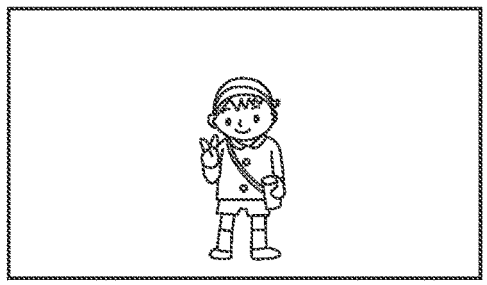

INITIAL DISPLAY
(PARTIALLY DEVELOPED)

ENLARGEMENT DISPLAY

DEVELOPMENT
INSTRUCTION

IMAGE PROCESSING APPARATUS, INFORMATION PROCESSING APPARATUS, IMAGE PROCESSING METHOD, AND INFORMATION PROCESSING METHOD

BACKGROUND OF THE INVENTION

Field of the Invention

The present invention relates to an image processing apparatus, an information processing apparatus, an image processing method, and an information processing method, and specifically relates to an information processing technique using an external apparatus.

Description of the Related Art

In a general image capture apparatus, image data in a format for general use such as a JPEG format is generated by applying various types of image processing called as developing processing to image data in a RAW format (RAW data) that is obtained from an image sensor. Although the image processing included in the developing processing is not strictly defined, in general, debayering processing (also referred to as demosaicing processing), RGB-YUV conversion processing, noise removal, correction of influence due to aberration of an optical system, white balance adjustment, tone conversion, encoding, and the like are performed. An image capture apparatus generates image data to be used for recording and displaying by executing developing processing using hardware and software included therein.

On the other hand, techniques regarding various types of image processing applied to the developing processing are advancing day by day, but in many cases, a new technique is developed on the premise of standard hardware performance at the time of development. Therefore, a new technique may not be implemented or a realistic processing time may not be realized with hardware mounted in a past image capture apparatus.

On the other hand, an image capture apparatus is proposed that can apply developing processing, without being limited by hardware and software included therein, by requesting an external apparatus to perform the developing processing (Japanese Patent Laid-Open No. 2008-236396).

The image capture apparatus disclosed in Japanese Patent Laid-Open No. 2008-236396 does not perform developing processing of RAW data by itself in a shooting mode in which developing processing is performed in an external apparatus. Instead, the image capture apparatus transmits RAW data to a server through a network, and receives image data subjected to developing processing from the server.

Therefore, there is problem in that, depending on a time needed for transmitting and receiving data through the network, or a time needed for developing processing in the server, the period of time from when shooting is performed until when a development result can be confirmed increases, and the usability degrades.

SUMMARY OF THE INVENTION

The present invention has been made in view of the problems described above, and provides, in one aspect, an image processing apparatus and an image processing method with which, even in a case where developing processing is performed using an external apparatus, the result of developing processing can be confirmed in a short period of time.

According to an aspect of the present invention, there is provided an image processing apparatus comprising: an obtaining circuit that obtains image data; a transmission circuit that transmits the image data to an external apparatus; an image processing circuit that applies first image processing to the image data; a reception circuit that receives a result of second image processing applied in the external apparatus to a part of the image data corresponding to a partial area of an entire image represented by the image data, prior to receiving a result of the second image processing applied in the external apparatus to the entirety of the image data corresponding to the entire image; and a display control circuit that controls display in a display apparatus, wherein the display control circuit, when causing the display apparatus to display the image data that has been transmitted to the external apparatus, causes the display apparatus to display the image data along with an indicator indicating a status of the second image processing being applied to the image data in the external apparatus.

According to another aspect of the present invention, there is provided an information processing apparatus comprising: a reception circuit that receives image data and information regarding the image data from an image processing apparatus; an image processing circuit that applies image processing to the image data; and a transmission circuit that transmits the image data, to which the image processing has been applied, to the image processing apparatus, wherein the image processing circuit determines a partial area of an entire image represented by the image data, based on the information, and applies the image processing to a part of the image data corresponding to the partial area, and the transmission circuit transmits, to the image processing apparatus, a result of the image processing applied to the part of the image data, prior to transmitting a result of the image processing applied to the entirety of the image data.

According to a further aspect of the present invention, there is provided an image processing method comprising: obtaining image data; transmitting the image data to an external apparatus; applying first image processing to the image data; receiving a result of second image processing applied in the external apparatus to a part of the image data corresponding to a partial area of an entire image represented by the image data, prior to receiving a result of the second image processing applied in the external apparatus to the entirety of the image data corresponding to the entire image; and controlling a display apparatus, wherein the controlling comprises causing the display apparatus to display the image data that has been transmitted to the external apparatus, and wherein the causing causes the display apparatus to display the image data along with an indicator indicating a status of the second image processing being applied to the image data in the external apparatus.

According to another aspect of the present invention, there is provided an information processing method comprising: receiving image data and information regarding the image data from an image processing apparatus; applying image processing to the image data; and transmitting image data to which the image processing has been applied to the image processing apparatus, wherein, the applying comprises: determining a partial area of an entire image represented by the image data based on the information, and applying the image processing to a part of the image data corresponding to the partial area, and wherein the transmitting, a result of the image processing applied to the part of the image data is transmitted to the image processing apparatus prior to transmitting a result of the image processing applied to the entirety of the image data.

According to a further aspect of the present invention, there is provided a non-transitory machine-readable medium storing a program for causing a computer to function as an image processing apparatus comprising: an obtaining unit configured to obtain image data; a transmission unit configured to transmit the image data to an external apparatus; an image processing unit configured to apply first image processing to the image data; a reception unit configured to receive a result of second image processing applied in the external apparatus to a part of the image data corresponding to a partial area of an entire image represented by the image data, prior to receiving a result of the second image processing applied in the external apparatus to the entirety of the image data corresponding to the entire image; and a display control unit configured to control display in a display apparatus, wherein the display control unit, when causing the display apparatus to display the image data that has been transmitted to the external apparatus, causes the display apparatus to display the image data along with an indicator indicating a status of the second image processing being applied to the image data in the external apparatus.

According to another aspect of the present invention, there is provided a non-transitory machine-readable medium storing a program for causing a computer to function as an information processing apparatus comprising: a reception unit configured to receive image data and information regarding the image data from an image processing apparatus; an image processing unit configured to apply image processing to the image data; and a transmission unit configured to transmit the image data, to which the image processing has been applied, to the image processing apparatus, wherein the image processing unit determines a partial area of an entire image represented by the image data, based on the information, and applies the image processing to a part of the image data corresponding to the partial area, and the transmission unit transmits, to the image processing apparatus, a result of the image processing applied to the part of the image data, prior to transmitting a result of the image processing applied to the entirety of the image data.

Further features of the present invention will become apparent from the following description of exemplary embodiments (with reference to the attached drawings).

BRIEF DESCRIPTION OF THE DRAWINGS

FIG. 8 is a flowchart of the operation in the playback mode of the image capture apparatus according to an embodiment of the present invention.

FIG. 12 shows another display example of the index in an embodiment of the present invention.

DESCRIPTION OF THE EMBODIMENTS

Figure 1:
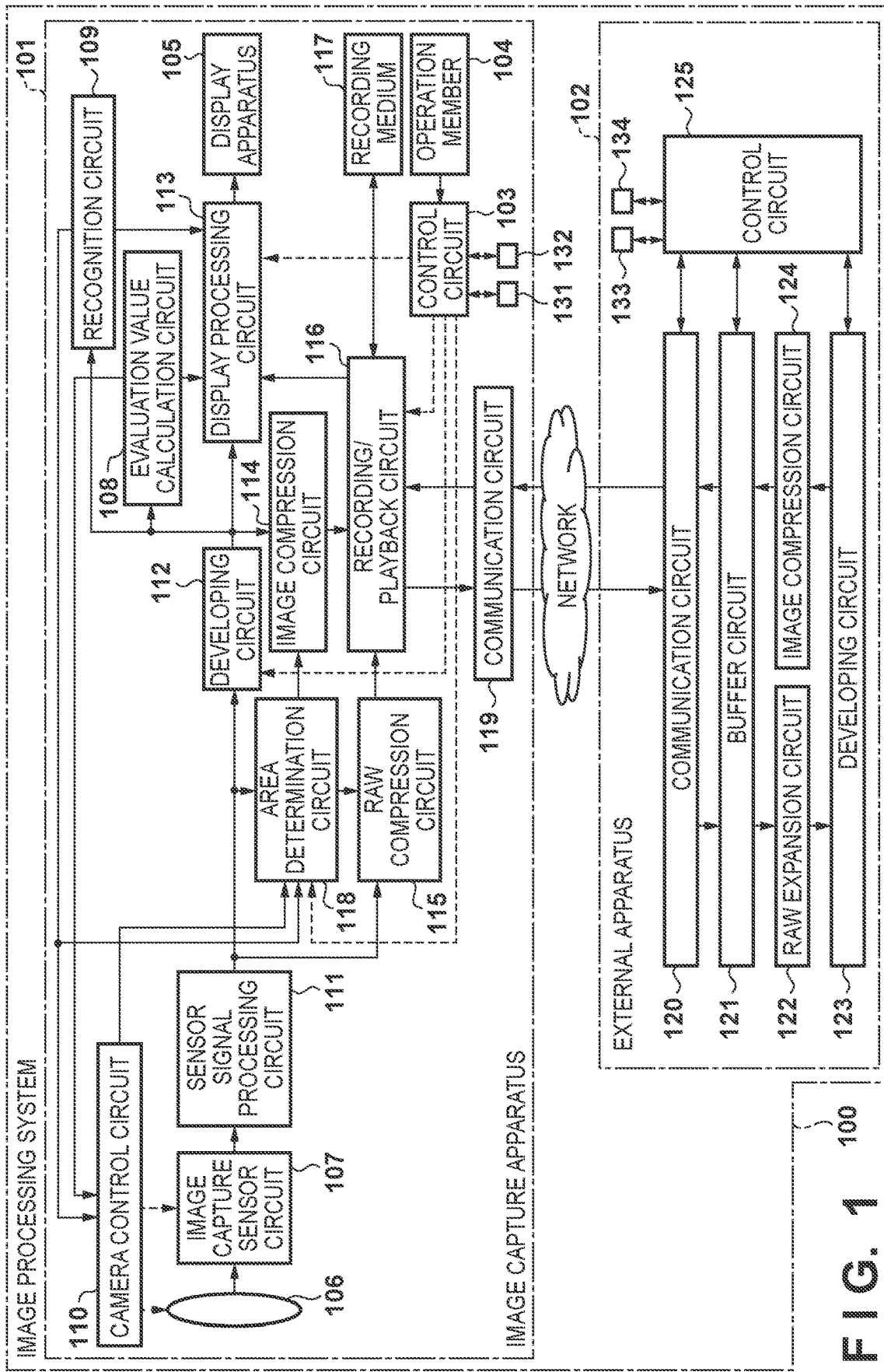
FIG. 1 is a block diagram showing an example of a functional configuration of an image processing system according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that, in the following embodiments, a case where the present invention is implemented in an image capture apparatus serving as an example of the image processing apparatus will be described. However, the present invention can be implemented in any electronic device that can handle RAW data and communicate with an external apparatus. Such an electronic device includes a computer device (such as a personal computer, a tablet computer, a media player, or a PDA), a mobile phone, a smartphone, a game machine, a robot, a drone, and a drive recorder. These are merely examples, and the present invention can be implemented in another electronic device.

Note that the constituent elements that are expressed as blocks in the drawings may each be realized by an integrated circuit (IC) such as an ASIC or a FPGA, a discrete circuit, or a combination between a memory and a processor that executes a program stored in the memory. Also, one block may be realized by a plurality of integrated circuit packages, or a plurality of blocks may be realized by one integrated circuit package. Also, the same block may be implemented in a different configuration according to the operation environment or the needed ability.

First Embodiment

FIG. 1 is a block diagram illustrating an exemplary functional configuration of an image processing system 100 according to an embodiment of the present invention. The image processing system 100 includes an image capture apparatus 101 (sometimes also referred to as a camera) and an external apparatus 102 that can communicate to each other through a network 200.

The image capture apparatus 101 includes, in addition to a function of recording image data of a subject image in a recording medium 117, a function of reading out image data from the recording medium 117 and displaying the image data, and a function of bidirectionally communicating with an external apparatus (e.g., a server) via the network 200.

The external apparatus 102 has a function of executing developing processing based on a newer technique than that of the developing processing that can be performed by the image capture apparatus 101, a function of executing a developing processing that cannot be performed by the image capture apparatus 101, and a function of bidirectionally communicating with the image capture apparatus 101 or another apparatus via the network.

As a result of requesting the external apparatus 102 to perform developing processing of RAW data, the image capture apparatus 101 can use the developing processing based on a newer technique than the developing processing that can be performed by the image capture apparatus 101, and the developing processing that cannot be performed by the image capture apparatus 101. Note that if, as a result of requesting the external apparatus 102 to perform developing processing, the time needed to perform the developing processing can be reduced or the like, the image capture apparatus 101 may request the external apparatus 102 to perform developing processing that is the same as the developing processing that can be performed by the image capture apparatus 101.

Also, the image capture apparatus 101, when requesting the external apparatus 102 to perform developing processing of RAW data, first, transmits a part of RAW data (partial RAW data) to the external apparatus 102, and thereafter transmits the entirety of RAW data (entire RAW data). The external apparatus 102 transmits, to the image capture apparatus 101, the development result of the partial RAW data prior to the development result of the entire RAW data.

Because the data amount of the partial RAW data is smaller than that of the entire RAW data, and the partial RAW data is subjected to developing processing prior to the entire RAW data, the image capture apparatus 101 can obtain the development result of the partial RAW data in a short period of time. Therefore, the time it takes until the result of development performed by the external apparatus 102 can be confirmed can be reduced with respect to a partial area represented by the partial RAW data. The development result of the entire RAW data is transmitted from the external apparatus 102 thereafter, and therefore the development result of the entire RAW data is used for recording.

The functional blocks of the image capture apparatus 101 will be described.

A control circuit 103 is a CPU (may also be called as an MPU or a microprocessor), for example, controls the operations of the units of the image capture apparatus 101 and realizes the functions of the image capture apparatus 101, by reading a program stored in a ROM 131 to a RAM 132 and executing the program.

The ROM 131 is a rewritable nonvolatile memory, and stores programs to be executed by the control circuit 103, various setting values of the image capture apparatus 101, GUI data, and the like. The RAM 132 is a main memory that is used by the control circuit 103 when executing a program.

An operation member 104 includes input devices such as a key, a button, and a touch panel that are used when a user gives an instruction to the image capture apparatus 101. The operation performed on the input devices of the operation member 104 is detected by the control circuit 103, and the control circuit 103 controls the units such that an operation according to the detected operation is to be executed.

A display apparatus 105 includes a display device such as a liquid crystal display (LCD), and displays an image that is shot or reproduced by the image capture apparatus 101, a menu screen, various types of information, and the like.

An imaging optical system 106 includes a plurality of lenses, an aperture that also functions as a shutter, and the like, and forms an optical image of a subject on an imaging surface of an image sensor circuit 107. The plurality of lenses include a focus lens for adjusting the in-focus distance of the imaging optical system 106. The driving of the focus lens is controlled by a camera control circuit 110 based on an evaluation value calculated by an evaluation value calculation circuit 108 and a recognition result of a recognition circuit 109.

Figure 2:
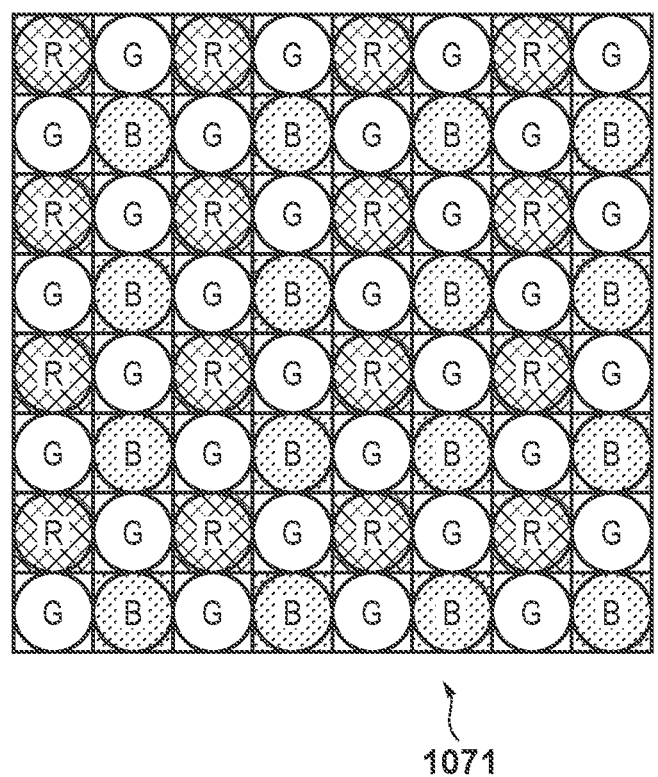
FIG. 2 is a diagram showing an example of a color filter which can be provided in the imaging sensor according to an embodiment of the present invention.

An image sensor circuit 107 is a CCD image sensor or a CMOS image sensor in which a plurality of pixels are two-dimensionally arranged. In the present embodiment, the image sensor circuit 107 includes a primary color Bayer array color filter 1071 as shown in FIG. 2. In the color filter 1071, one region of red (R), green (G), or blue (B) corresponds to one pixel. Therefore, pixel data constituting the RAW data includes values each represent the luminance of a color (one of R, G, and B) of the corresponding color filter. The operations of the image sensor circuit 107 is controlled by the camera control circuit 110.

An optical image of a subject that is formed on the imaging surface by the imaging optical system 106 is converted to an electrical signal (analog image signal) by a photoelectric conversion unit included in each pixel of the image sensor circuit 107, the electrical signal is converted to a digital signal (A/D conversion), and the digital signal is output as image data. The A/D conversion may be performed outside the image sensor circuit 107.

The image data output from the image sensor circuit 107 is input to a sensor signal processing circuit 111. The sensor signal processing circuit 111 corrects data of a defective pixel included in the image sensor circuit 107. In the correction processing, processing for generating the value of a defective pixel by interpolating values of peripheral pixels, processing for subtracting a predetermined offset value from the value of a defective pixel, or the like may be performed. Note that the correction processing of the defective pixel is not limited thereto.

The sensor signal processing circuit 111 outputs image data subjected to correction processing. In the present embodiment, the image data output from the sensor signal processing circuit 111 is called as RAW data. Note that another processing may be applied before requesting the developing processing. The image data to be transmitted from the image capture apparatus 101 to the external apparatus 102 in order for the external apparatus 102 to apply the developing processing to the image data may be called as RAW data.

A developing circuit 112 applies developing processing as image processing (first image processing) performed on RAW data. Here, following pieces of processing are performed as the developing processing, but another processing may be included.
- debayering processing (may also be called as demosaicing processing, color interpolation processing, synchronization processing, or the like)
- white balance adjustment processing
- conversion processing from an RGB format to a YUV format
- noise removal or suppression processing
- processing for correcting influence due to optical aberration of the imaging optical system 106.

The developing circuit 112 outputs image data obtained by applying the developing processing to an image compression circuit 114, the evaluation value calculation circuit 108, and the recognition circuit 109. The developing circuit 112 further generates display image data by converting the resolution of image data obtained by applying the developing processing, and outputs the display image data to a display processing circuit 113. Note that the display image data may be output to the evaluation value calculation circuit 108 and the recognition circuit 109.

The display processing circuit 113 (display control means) stores display image data supplied from the developing circuit 112 to a video memory. The display processing circuit 113 also stores image data that represents various types of information to be displayed in a manner of superimposing on the image data to a video memory, and supplies a display signal of an image obtained by performing synthesis with captured image data to the display apparatus 105. Note that the generation of display image data may be performed by the display processing circuit 113.

The evaluation value calculation circuit 108 calculates various evaluation values to be used for automatic focus detection (AF), automatic exposure control (AE), and the like, from the image data, and outputs the evaluation values to the camera control circuit 110 and the display processing circuit 113.

The recognition circuit 109 detects a subject area such as a face or human body from the image data, and performs individual recognition with respect to the detected subject area. The recognition circuit 109 outputs the recognition result (position or size of the subject area, individual recognition result, etc.) to the camera control circuit 110 and the display processing circuit 113. The detection of a subject area and the individual recognition that are performed by the recognition circuit 109 can be performed using a known technique, and therefore the description of the details thereof will be omitted.

The image compression circuit 114 encodes image data in accordance with a predetermined encoding method, and generates an image data file in which encoded image data whose data amount and/or information amount have been reduced is stored. The typical encoding methods are a JPEG format, a GIF format, an HEIF format, and the like for a still image, and an MPEG2 format, an H.264 format, an H.265 format, or the like for a moving image, but there is no limitation thereto. Various types of information can be recorded to the image data file as auxiliary data or metadata. In the present embodiment, the image compression circuit 114 records area information output from an area determination circuit 118 to the image data file as metadata.

The area determination circuit 118 extracts partial RAW data corresponding to a partial area of the shot image, from the RAW data, based on focus detection area information at the time of shooting that is output from the camera control circuit 110, the output of the recognition circuit 109, and the user instruction input thorough the operation member 104. The area determination circuit 118 outputs the extracted partial RAW data to a RAW compression circuit 115. In this document, the RAW data corresponding to a part of the shot image is referred to as partial RAW data, and the RAW data corresponding to the entirety of the shot image is referred to as entire RAW data.

Also, the area determination circuit 118 outputs coordinate data (called as area information) for specifying the position of the partial area corresponding to the partial RAW data in the entire captured image to the RAW compression circuit 115 and the image compression circuit 114.

The RAW compression circuit 115 encodes the partial RAW data output from the area determination circuit 118 and the entire RAW data output from the sensor signal processing circuit 111, and generates a RAW data file in which RAW data whose data amount and/or information amount are reduced is stored. There is no limitation to the encoding method, and any of lossless encoding and lossy encoding may be adopted. For example, an encoding method using a wavelet transformation or differential encoding may be adopted. The RAW compression circuit 115 records area information output from the area determination circuit 118 to the RAW data file as metadata, similarly to the image compression circuit 114. Note that the encoding of RAW data is not essential.

The image data file generated by the image compression circuit 114 and the RAW data file generated by the RAW compression circuit 115 are recorded in the recording medium 117 by a recording/playback circuit 116. The recording medium 117 may be a memory card, a hard disk (HDD), a semiconductor disk drive (SSD), and the like, for example. Note that the recording medium 117 may also be an external storage apparatus that is communicably connected, or a storage apparatus included in an external apparatus that is communicably connected.

The recording/playback circuit 116 can read out an image data file and a RAW data file that are recorded in the recording medium 117.

The recording/playback circuit 116 also functions as means (transmission means and reception means) that can bidirectionally communicate with the external apparatus 102 connected to the network 200 through a communication circuit 119. The communication circuit 119 is a communication interface conforming to at least one standard of wireless communication and/or wired communication.

Next, the functional blocks of the external apparatus 102 will be described. The external apparatus 102 is an information processing apparatus, and may be a general purpose computer apparatus that can function as a server, for example.

A control circuit 125 is a CPU (may also be called as an MPU or a microprocessor), for example, realizes the functions of the external apparatus 102 such as developing processing by reading a program stored in a ROM 133 to a RAM 134 and executing the program.

The ROM 133 is a rewritable nonvolatile memory, and stores programs to be executed by the control circuit 125, various setting values of the external apparatus 102, GUI data, and the like. The RAM 134 is a main memory that is used by the control circuit 125 when executing a program.

Note that the external apparatus 102 may include input devices represented by a keyboard and a mouse, which are not illustrated.

A communication circuit 120 is a communication interface conforming to at least one standard of wireless communication and/or wired communication, similarly to the communication circuit 119. The control circuit 125 can bidirectionally communicate with the image capture apparatus 101 connected to the network 200 through the communication circuit 119.

A buffer circuit 121 is a storage apparatus that stores a RAW data file received from the image capture apparatus 101, and may be a partial area of the RAM 134.

If RAW data stored in a RAW data file stored in the buffer circuit 121 is encoded, a RAW expansion circuit 122 decodes the RAW data, and outputs the decoded RAW data to a developing circuit 123. If the RAW data is not encoded, the RAW expansion circuit 122 outputs the RAW data to the developing circuit 123 without performing decoding.

The developing circuit 123 applies developing processing to the RAW data supplied from the RAW expansion circuit 122 as image processing (second image processing). The developing processing applied by the developing circuit 123 is typically developing processing that cannot be applied by the developing circuit 112 of the image capture apparatus 102 and/or developing processing with which higher quality result can be obtained than the developing processing applied by the developing circuit 112. For example, the developing processing applied by the developing circuit 123 may be developing processing in which a method is applied with which more favorable result can be obtained with respect to processing items that constitute the developing processing applied by the developing circuit 112, or developing processing that is applied to a processing item that is not processed in the developing circuit 112. The developing circuit 123 may include dedicated image processing hardware (ASIC, etc.) for performing complex developing processing at a high speed. Also, at least some of the developing processing performed by the developing circuit 123 may be realized by the control circuit 125 executing a program.

An image compression circuit 124 encodes image data subjected to the developing processing that is supplied from the developing circuit 123, similarly to the image compression circuit 114, and generates an image data file that stores the encoded image data. The image compression circuit 124 stores the generated image data file to the buffer circuit 121.

The control circuit 125 transmits an image data file stored in the buffer circuit 121 to the image capture apparatus 101 via the communication circuit 120.

Note that, in the example in FIG. 1, a configuration is adopted in which determination of the focus detection area, driving of the focus lens, determination of the exposure condition, driving of the aperture (shutter), driving of the image sensor circuit 107 and reading out therefrom are performed by the camera control circuit 110, but a configuration may be adopted in which the control circuit 103 performs these operations. In this case, the camera control circuit 110 is not needed.

Next, the operation modes of the image capture apparatus 101 will be described using FIG. 3.

Figure 3:
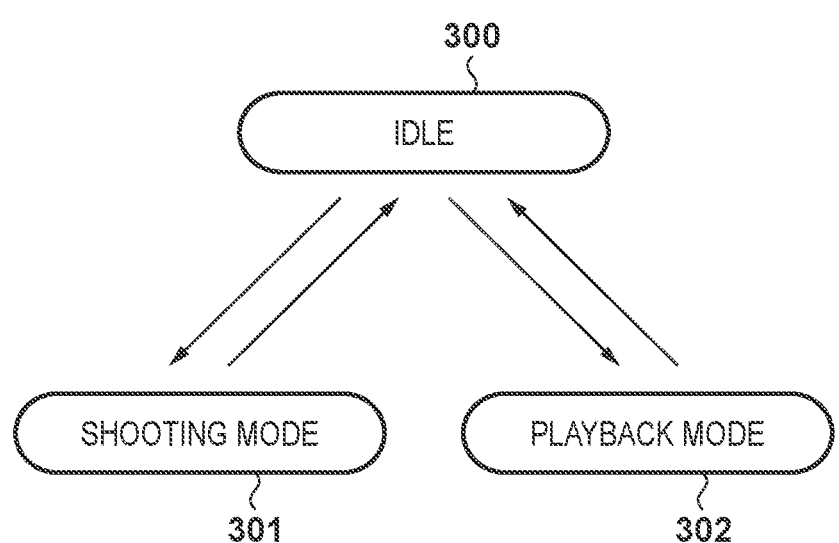
FIG. 3 is a state transition diagram of the image capture apparatus according to an embodiment of the present invention.

FIG. 3 is a diagram illustrating the operation modes that the image capture apparatus 101 has, and the transition relation between the operation modes. The transition of operation mode is executed in accordance with a user instruction made through the operation member 104, occurrence of a predetermined event, or determination made by the control circuit 103. Therefore, the transition of operation mode may be incurred in accordance with the user operation, or may be automatically incurred regardless of the user operation.

The image capture apparatus 101 has a shooting mode 301 and a playback mode 302 as the operation mode, and the transition between the shooting mode 301 and the playback mode 302 is performed via an idle state 300.

The shooting mode 301 is an operation mode in which a still image or a moving image is shot and recorded. Also, the playback mode 302 is an operation mode in which image data recorded in the recording medium 117 is reproduced and displayed in the display apparatus 105.

Operations in Shooting Mode

Figure 4:
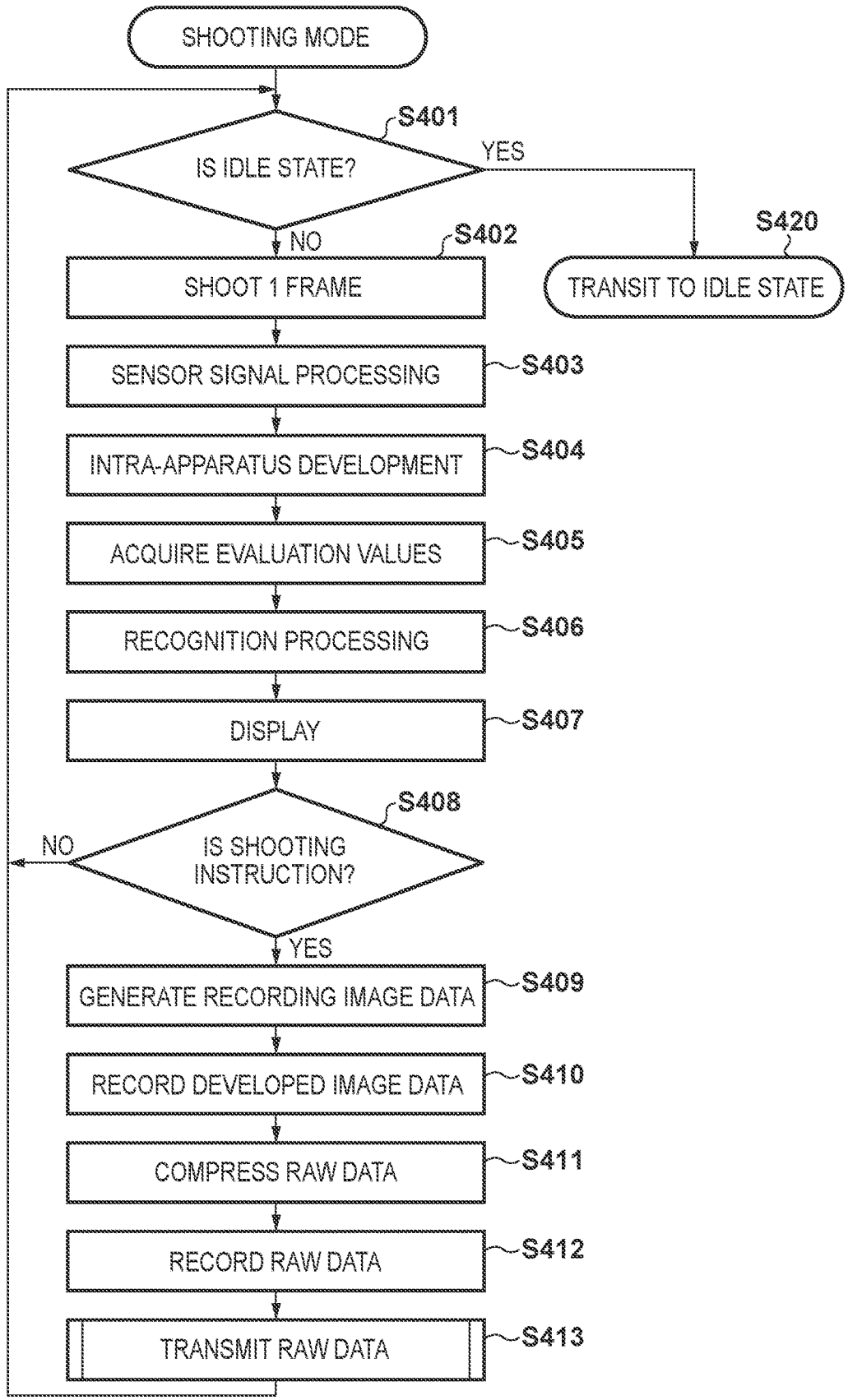
FIG. 4 is a flowchart of the operation of the image capture apparatus according to an embodiment of the present invention that is in a shooting mode.

The operations of the image capture apparatus 101 in the shooting mode will be described using a flowchart shown in FIG. 4. The operations shown in the flowchart in FIG. 4 is realized by the control circuit 103 controlling functional blocks that perform operations in each step described below by reading a program from the ROM 131 to the RAM 132, and executing the program.

In step S401, the control circuit 103 determines whether or not the image capture apparatus 101 is in a status of being able to transition to the idle state, regarding the processing load. If it is determined that image capture apparatus 101 is in a status of being able to transition to the idle state, regarding the processing load, the control circuit 103 causes the image capture apparatus 101 to transition to the idle state at a predetermined probability (step S420). Also, if it is not determined that image capture apparatus 101 is in a status of being able to transition to the idle state, regarding the processing load, the control circuit 103 executes step S402.

For example, in a state in which the processing load is high as in the case of high speed successive shooting, the processing in step S402 is always executed. In a case of single shooting, in a period in which the shooting operation is not performed, transition to the idle state occurs at a probability of 50%.

The operations in steps S402 to S408 are operations to be performed in a shooting stand-by state. In the present embodiment, in the shooting stand-by state, the image capture apparatus 101 waits for an input of a shooting start instruction while continuing a live view display in the display apparatus 105. Also, the image capture apparatus 101 may perform another processing using a frame image of a moving image that is shot for the live view display. Here, acquisition of an evaluation value and recognition processing are performed, as an example.

In step S402, the camera control circuit 110 shoots one frame of a moving image by controlling the operations of the imaging optical system 106 and the image sensor circuit 107. The camera control circuit 110 can, when determining the shooting settings, consider the evaluation value obtained by the evaluation value calculation circuit 108, the result of recognition performed by the recognition circuit 109, the settings stored in the ROM 131, and the like. The camera control circuit 110 can adjust the in-focus distance of the imaging optical system 106 such that an area specified based on a recognition result of the recognition circuit 109 is brought into focus.

In step S403, the camera control circuit 110 reads out image data from the image sensor circuit 107, and supplies the image data to the sensor signal processing circuit 111. The sensor signal processing circuit 111 applies the aforementioned correction processing to the image data, and supplies the corrected image data to the developing circuit 112 as RAW data.

In step S404, the developing circuit 112 applies the aforementioned developing processing to the RAW data (intra-apparatus development). Note that the developing circuit 112 uses hardware mounted in the image capture apparatus, and therefore the communication time that is incurred when developing processing is performed using the developing circuit 123 included in the external apparatus is not incurred. Therefore, from the viewpoint of high speed developing processing, the developing circuit 112 is advantageous relative to the developing circuit 123. The image data subjected to the developing processing is converted to have a resolution suitable for display in the display apparatus 105, as needed.

In step S405, the evaluation value calculation circuit 108 calculates evaluation values regarding a focusing state, an exposure state, and the like from the image data subjected to the developing processing. The evaluation values calculated here may be known evaluation values such as a contrast value and a luminance value. Note that the evaluation value calculation circuit 108 may calculate similar evaluation values with respect to RAW data before being subjected to the developing processing.

In step S406, the recognition circuit 109 applies recognition processing, to the image data subjected to the developing processing, in which detection of subject information, recognition of the detected subject information, and the like are performed.

Note that the pieces of processing in steps S405 and S406 may be performed in a reverse order, or may be executed in parallel.

In step S407, the display processing circuit 113 generates display image data by synthesizing an image representing various types of auxiliary information to the image data subjected to development, and displays the synthesized image in the display apparatus 105. The auxiliary information includes information regarding the current setting values and state, information based on evaluation value information and subject information that are supplied from the evaluation value calculation circuit 108 and the recognition circuit 109, and the like. For example, a frame display indicating an area that is currently brought into focus and a recognized subject area is included in the auxiliary information.

In step S408, the control circuit 103 determines whether or not a shooting start instruction from the user has been input through the operation member 104, and if it is determined that the shooting start instruction has been input, executes step S409, and if not, executes step S401 again.

In step S409, the control circuit 103 performs operations from execution of still image shooting until generation of recording image data by controlling the units. The shooting settings (exposure and focusing control) at the time of still image shooting can be determined based on evaluation values acquired in the shooting stand-by state.

In step S410, the image compression circuit 114 generates encoded image data by encoding developed image data that is output from the developing circuit 112, and generates a still image data file in which the encoded image data is stored. Also, the recording/playback circuit 116 records the still image data file in the recording medium 117.

In step S411, the RAW compression circuit 115 generates a RAW data file whose information amount and/or data amount are reduced (compresses) by applying encoding processing to the RAW data output from the sensor signal processing circuit 111. Note that the encoding in the RAW compression circuit 115 is not essential. When encoding is not performed, the RAW compression circuit 115 can generate a RAW data file in which the RAW data output from the sensor signal processing circuit 111 is stored as is. Also, when lossy encoding is applied, encoding parameters are selected such that the information of the RAW data to be lost by encoding will not incur large influence on the quality.

In step S412, the recording/playback circuit 116 records the RAW data file in the recording medium 117. Note that, here, the image data subjected to the developing processing and the RAW data are recorded as separate data files, but these pieces of data may be collectively recorded as one image data file. Also, instead of the recording medium 117, or in addition to the recording medium 117, the image data file may be recorded in a recording apparatus included in an external apparatus that is communicably connected to the image capture apparatus 101.

In step S413, the RAW compression circuit 115 generates a RAW data file in which RAW data to be transmitted to the external apparatus 102 is stored. The recording/playback circuit 116 transmits this RAW data file to the external apparatus 102 through the communication circuit 119. The data communication between the external apparatus 102 and the recording/playback circuit 116 can be performed using any known method, and therefore the description of the details thereof is omitted. As will be described later, in the present embodiment, the RAW compression circuit 115 generates two types of RAW data files. Thereafter, the control circuit 103 again executes the processing in step S401 in order to return to the operation in the shooting stand-by state.

Next, the details of processing for transmitting the RAW data file in step S413 will be described using a flowchart in FIG. 5.

In step S501, the area determination circuit 118 determines a partial area to be transmitted to the external apparatus 102, from the image represented by the RAW data output from the sensor signal processing circuit 111. The details of the method of determining the partial area will be described later. The area determination circuit 118 outputs the information (area information) regarding the determined partial area and the partial RAW data corresponding to the partial area to the RAW compression circuit 115.

In step S502, the RAW compression circuit 115 generates a RAW data file in which the RAW data corresponding to the partial area determined by the area determination circuit 118 is stored. Here, the RAW data may be or may not be encoded. Note that the processing for extracting RAW data corresponding to the partial area determined by the area determination circuit 118 from the RAW data corresponding to the entirety of the shot image output from the sensor signal processing circuit 111 may be performed by the area determination circuit 118 or may be performed the RAW compression circuit 115.

In the following description, the RAW data corresponding to the entirety of a shot image is called as entire RAW data, and the RAW data file in which entire RAW data is stored is called as an entire RAW data file. Also, the RAW data corresponding to a partial area of a shot image is called as partial RAW data, and the RAW data file in which partial RAW data is stored is called as a partial RAW data file.

In step S503, the recording/playback circuit 116 transmits the partial RAW data file to the external apparatus 102 via the communication circuit 119.

In step S504, the RAW compression circuit 115 generates an entire RAW data file.

In step S505, the recording/playback circuit 116 transmits the entire RAW data file to the external apparatus 102 via the communication circuit 119.

The processing described above is the processing for transmitting the RAW data.

The transmitted partial RAW data file and entire RAW data file are each subjected to successive developing processing performed by the external apparatus 102. Then, the image data files to which the developing processing have been applied are returned to the image capture apparatus 101 in the order from the developing processing result of the partial RAW data file. In the following, the image data file in which image data obtained by performing developing processing on the partial RAW data file is stored is called as a partial image data file, and an image data file in which image data obtained by performing developing processing on the entire RAW data file is stored is called as an entire image data file.

The image capture apparatus 101 receives the image data file from the external apparatus 102 through the communication circuit 119. The recording/playback circuit 116 records the received image data file in the recording medium 117.

Note that the reception of an image data file from the external apparatus 102 occurs at a timing independent from the operations in the shooting mode shown in FIG. 4. Therefore, the recording operation of an image data file performed by the recording/playback circuit 116 is executed in parallel to the operations in the shooting mode shown in FIG. 4.

The recording/playback circuit 116 records an image data file in which the development result of partial RAW data is stored such that the image data that has been obtained by performing development in the apparatus and recorded in step S410 will not be overwritten. When an image data file in which the development result of entire RAW data is stored is received, the recording may be performed such that the image data that has been obtained by performing development in the apparatus and recorded in step S410 is overwritten. Also, when an image data file in which the development result of entire RAW data is stored is received, the image data file in which the development result of partial RAW data is stored and that has previously been received may be deleted.

Here, the data structure of the image data file and the structure of the RAW data file in the present embodiment will be described using FIGS. 6A and 6B.

Figure 6A:
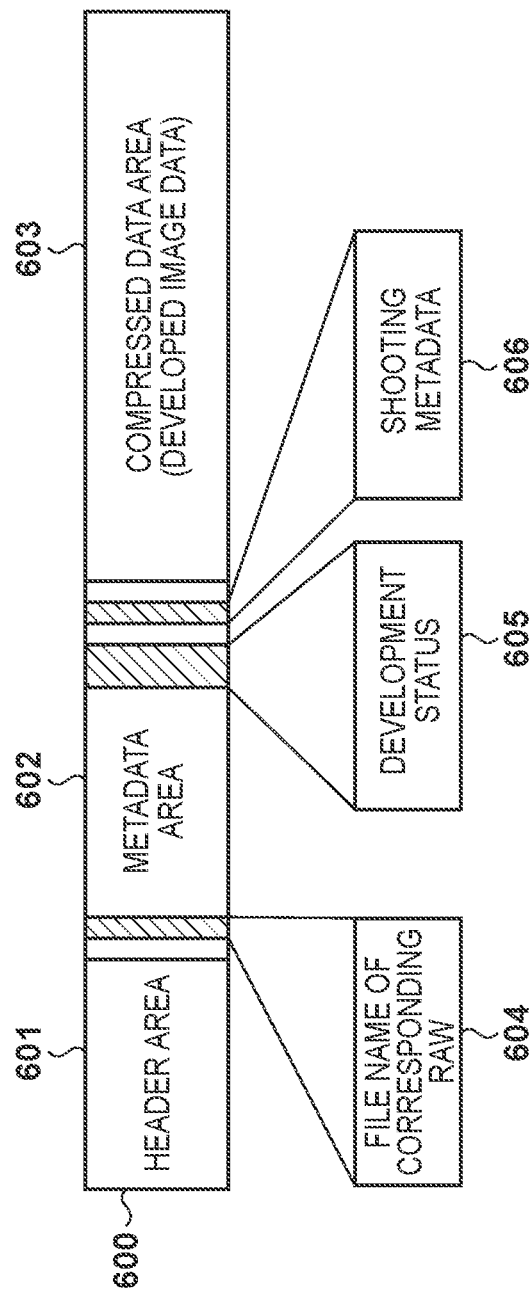
FIGS. 6A and 6B are diagrams showing configuration examples of an image data file according to an embodiment.

FIG. 6A is a diagram illustrating an example of the data structure of an image data file 600 in which image data subjected to developing processing is stored. The image data file 600 is recorded in a predetermined recording area of the recording medium 117 by the recording/playback circuit 116, for example The image data file 600 includes a header area 601, a metadata area 602, and a compressed data area 603.

The file name of an image data file, an identification code indicating that the data file is recorded in a predetermined image data file format, and the like are stored in the header area 601.

The coded data (compressed data) of image data subjected to developing processing is stored in the compressed data area 603.

The identification information (e.g., file name) 604 of a RAW data file from which the image data file is generated is stored in the metadata area 602. Also, the metadata area 602 includes a development status 605 indicating information regarding the developing processing of the image data. The identification information of a developing circuit that has performed developing processing on the image data stored in the compressed data area 603, information indicating which of a partial area and an entire region the image data corresponds to, and the like are stored in the development status 605. Also, the metadata area 602 includes information (area information) indicating the position of a partial area.

Also, the metadata area 602 includes shooting metadata 606 including data regarding information that is used at the time of shooting. The shooting metadata 606 may include the evaluation value calculated by the evaluation value calculation circuit 108, the recognition result of the recognition circuit 109, and information regarding the imaging optical system 106, the image sensor circuit 107, and the like. The information regarding the imaging optical system 106, the image sensor circuit 107, and the like includes lens type identification information, sensor type identification information, focus detection area information, and the like, but there is no limitation thereto. In addition, the metadata area 602 may include another information such as the identification code of a recording medium in which a RAW data file from which the image data file is generated is recorded, and the file path information of the RAW data file.

Figure 6B:
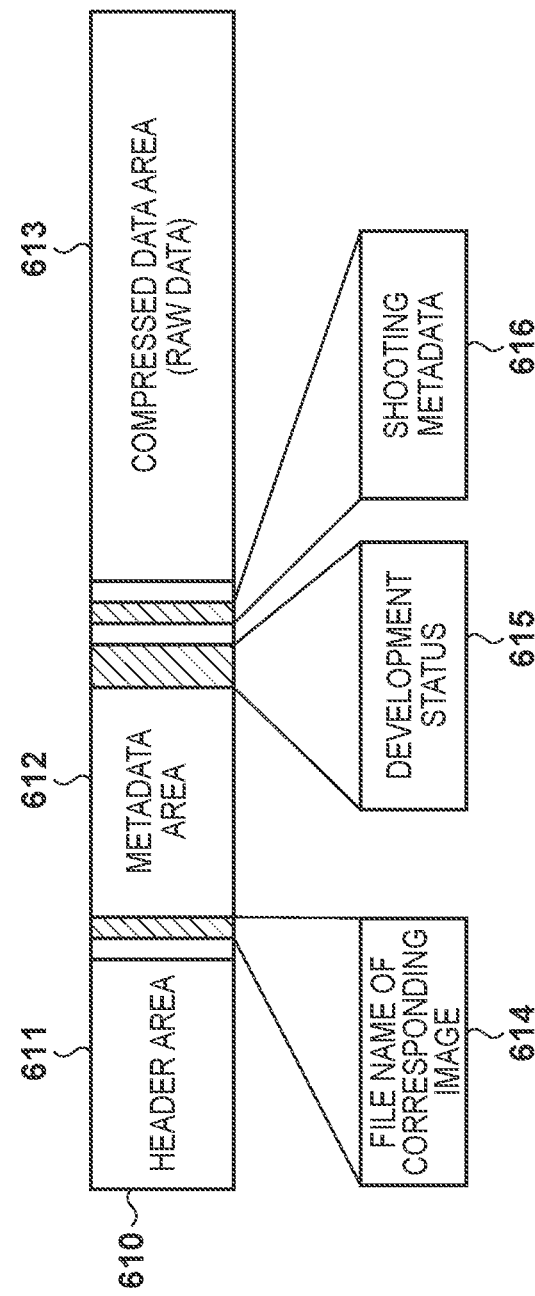

FIG. 6B is a diagram illustrating an example of the data structure of a RAW data file 610 in which RAW data is stored. The RAW data file 610 is recorded in a predetermined recording area of the recording medium 117 by the recording/playback circuit 116, for example.

The RAW data file 610 includes a header area 611, a metadata area 612, and a compressed data area 613. Note that the RAW data may not be encoded, as described above, and therefore the RAW data stored in the compressed data area 613 may be an uncompressed data.

The file name of a RAW data file, an identification code indicating that the data file is recorded in a RAW data file format, and the like are stored in the header area 611.

RAW data that is encoded or not encoded is stored in the compressed data area 613.

Identification information (e.g., file name) 614 of an image data file in which the development result of RAW data stored in this RAW data file is stored is stored in the metadata area 612. Also, the metadata area 612 includes development status 615 indicating information regarding developing processing of image data stored in the image data file corresponding to the identification information 614. The development status 615 includes the identification information of a developing circuit that has performed developing processing on the image data, information indicating which of a partial area and an entire region the image data corresponds to, and the like. Also, the metadata area 612 includes information (area information) indicating the position of a partial area.

Also, the metadata area 612 includes shooting metadata 616 including data regarding information that has been used at the time of shooting. The shooting metadata 616 may include an evaluation value calculated by the evaluation value calculation circuit 108, a recognition result of the recognition circuit 109, and information regarding the imaging optical system 106, the image sensor circuit 107, and the like. The information regarding the imaging optical system 106, the image sensor circuit 107, and the like includes lens type identification information, sensor type identification information, focus detection area information, and the like, but there is no limitation thereto. In addition thereto, the metadata area 612 may include another information such as the identification code of a recording medium in which an image data file in which image data subjected to developing processing is stored is recorded and file path information regarding the image data file. Note that the configuration may also be such that the image data obtained by performing developing processing on RAW data included in the compressed data area 613 is scaled, as needed, and the resultant data is stored in the metadata area 612.

The file structures illustrated in FIGS. 6A and 6B are examples of the file structure that can be used in the present embodiment, and may also be a file structure conforming to the standard such as Exif (Exchangeable image file format).

Next, the method of the area determination circuit 118 determining a partial area will be described using FIGS. 7A to 7D. In the present embodiment, when requesting external apparatus 102 to perform developing processing, first, RAW data corresponding to a partial area of the captured image is transmitted to the external apparatus 102. With this, the time needed for communication with the external apparatus 102 and developing processing in the external apparatus 102 is reduced, and the result of development performed on the partial area can be obtained in a short period of time.

It is envisioned that the user uses the development result regarding a partial area that can be obtained first as information used to determine the quality of the result of developing processing to be performed on the entire image. Therefore, in the present embodiment, the area determination circuit 118 determines a main subject area or a region including the main subject area as the partial area.

One example of the method of determining a partial area including a subject area will be described.

Figure 7A:
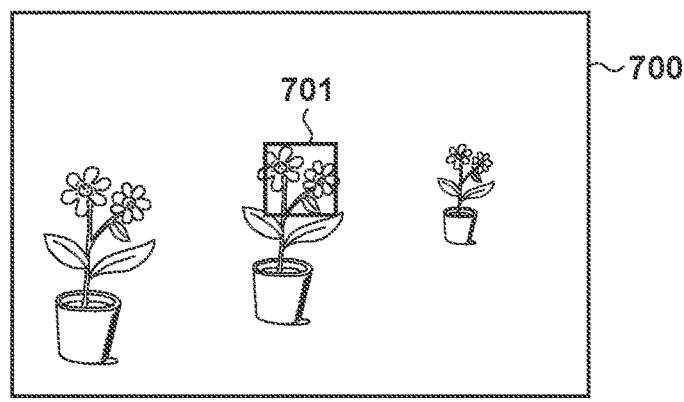
FIGS. 7A to 7D are diagrams showing examples of a region determination method according to the present embodiment.
Figure 7B:
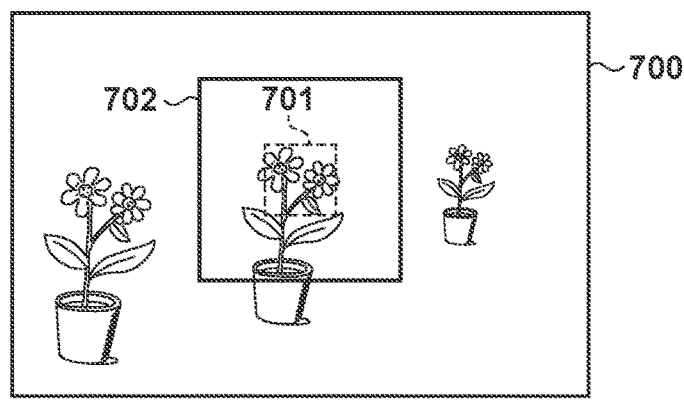

FIGS. 7A and 7B show an example of the area determination circuit 118 determining a partial area using information regarding a focus detection area supplied from the camera control circuit 110. 700 indicates the entirety of a shot image, and 701 indicates a focus detection area that is used at the time of shooting. In the example in FIG. 7A, the area determination circuit 118 determines the focus detection area 701 as the partial area as is. On the other hand, in the example in FIG. 7B, the area determination circuit 118 determines a rectangular area 702 whose central position is the same as that of the focus detection area 701 and that includes the entirety of the focus detection area 701 and is larger than the focus detection area 701 as the partial area.

Note that, in the examples shown in FIGS. 7A and 7B, the focus detection area 701 is a fixed region set at the center of the shooting range, but the position of the focus detection area 701 may be able to be designated by the user, for example.

Figure 7C:
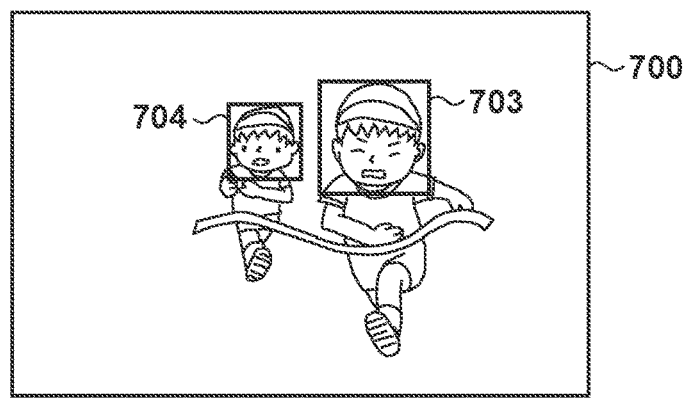
Figure 7D:
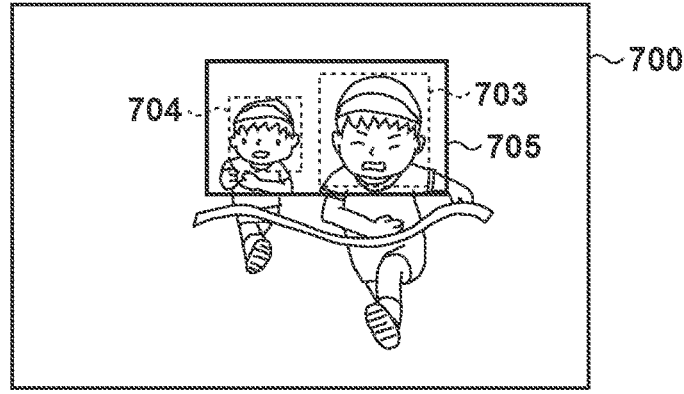

FIGS. 7C and 7D show an example in which the area determination circuit 118 determines the partial area using a recognition result of the recognition circuit 109. 703 and 704 indicate face areas detected as subject areas by the recognition circuit 109. The area determination circuit 118 can determines a face area, or an area including the face area as the partial area, for example. FIG. 7D shows an example of determining a rectangular area 705 including both of the face areas 703 and 704 as the partial area. Note that when a plurality of subject areas are detected, as shown in FIG. 7C, one of them may be determined as the main subject area, and the main subject area or a region including the main subject area may be determined as the partial area. The main subject area can be determined using a known method, and a largest subject area, or a subject area closest to the center of the image can be determined as the main subject area, for example.

The method of determining the partial area described above is merely an example, and the partial area may be determined by considering at least two of the focus detection area, the evaluation value, and the subject area in a composite manner. Note that the partial area is an area smaller than the entire image from the viewpoint of time reduction. Also, an upper limit may be determined regarding the size of the partial area. Also, the configuration may be such that the user can designate the partial area through the operation member 104.

Operations in Playback Mode

The operations of the image capture apparatus 101 in the playback mode will be described using a flowchart shown in FIG. 8. The operations shown in the flowchart in FIG. 8 is realized by the control circuit 103 controlling functional blocks that perform operations in each step described below by reading a program from the ROM 131 to the RAM 132, and executing the program.

In step S801, the control circuit 103 determines whether or not the image capture apparatus 101 is in a status of being able to transition to the idle state, regarding the processing load. If it is determined that image capture apparatus 101 is in a status of being able to transition to the idle state, regarding the processing load, the control circuit 103 causes the image capture apparatus 101 to transition to the idle state at a predetermined probability (step S810). Also, if it is not determined that image capture apparatus 101 is in a status of being able to transition to the idle state, regarding the processing load, the control circuit 103 executes step S802.

For example, in a period in which an input of a playback instruction through the operation member 104 is waited for, control circuit 103 determines that the processing load is low, and causes the image capture apparatus 101 to transition to the idle state. On the other hand, when the playback instruction has been input and the playback of an image has been started (including a state of being reproduced), the control circuit 103 does not determine that the processing load is low, and does not incur transition to the idle state.

In step S802, the control circuit 103 detects a development state regarding the developing processing that is performed using the external apparatus 102 with respect to the RAW data corresponding to image data to be reproduced. Here, the image data to be reproduced is image data that has been developed by the developing circuit 112. For example, the image data may be image data included in an image data file that has been recorded in step S410 that has been executed most recently.

In the present embodiment, the development state of image data to be displayed includes the following four development states corresponding to the state of transmission and reception of image data with an external apparatus.
(1) Undeveloped: state in which partial RAW data is not transmitted to the external apparatus 102.
(2) Developing: state in which the partial RAW data has been transmitted to the external apparatus 102, but a developing processing result has not been received.
(3) Partially developed: state in which the developing processing result of the partial RAW data has been received, but the reception of a developing processing result of entire RAW data has not been completed.
(4) Totally developed: state in which the developing processing result of the entire RAW data has been received.

Here, an example of detecting a development state corresponding to the state of transmission and reception of image data with the external apparatus 102 has been described. However, the development state based on another state may be detected. For example, the development state may be detected by referring to the development status included in a metadata area of the image data file, or the configuration may also be such that a file name is assigned so as to indicate the development state, and the development state is detected based on the file name that is present in the recording medium 117. The control circuit 103 outputs the detected development state to the display processing circuit 113.

Figure 9:
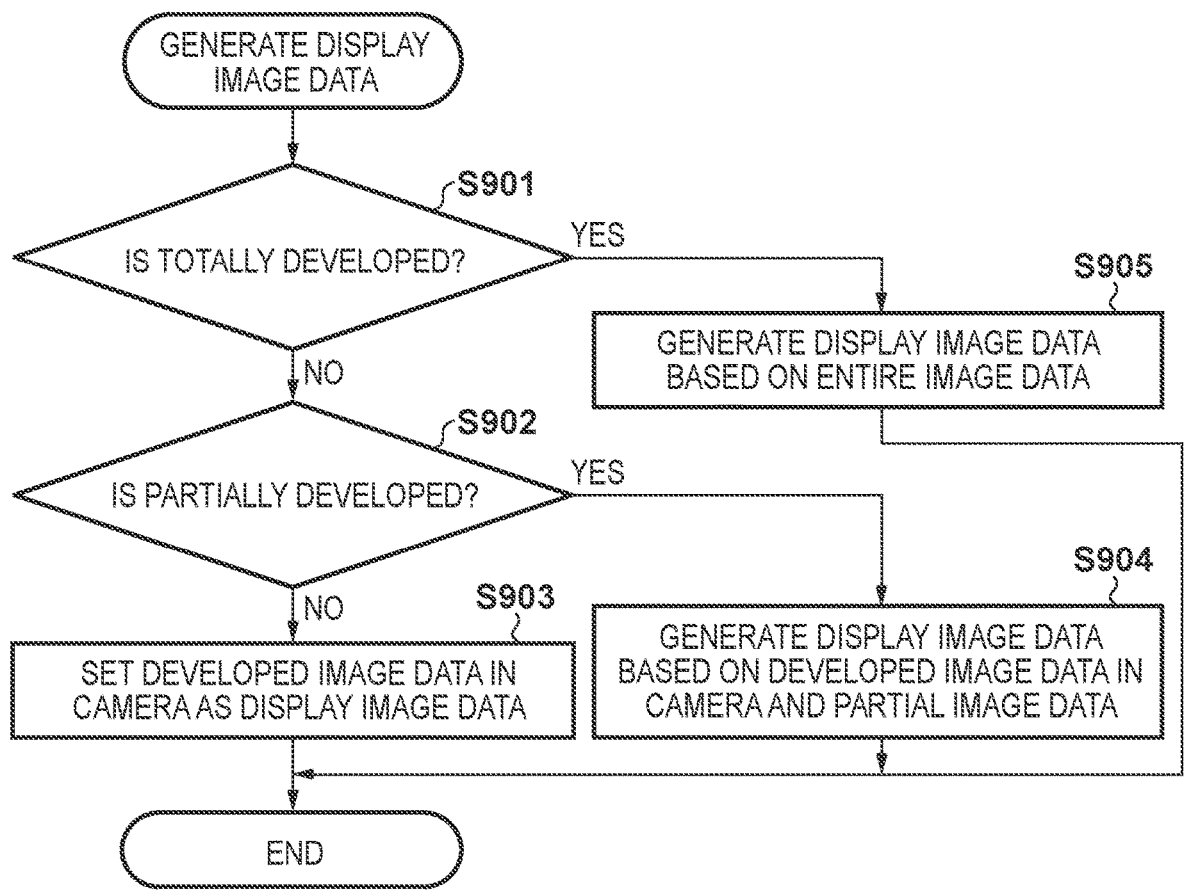
FIG. 9 is a flowchart of the details of FIG. 8.

In step S803, the display processing circuit 113 generates display image data. The details of operations to generate the display image data will be described using a flowchart shown in FIG. 9.

In step S901, the display processing circuit 113 determines whether or not the development state supplied from the control circuit 103 is a state of totally developed, and if it is determined to be the state of totally developed, executes step S905, and if not, executes step S902.

In step S905, the display processing circuit 113 generates display image data suitable for display to be performed by the display apparatus 105 based on entire image data that is the result of developing processing performed on the entire RAW data, and ends the display image data generation processing. The display image data may have a resolution suitable for display in the display apparatus 105, and may also be image data obtained by synthesizing an image that represents auxiliary information. The auxiliary information is not specifically limited, and includes shooting settings (such as a shutter speed, an F-number, an ISO speed, and an exposure correction value), and information obtained from an image (e.g., a histogram, information indicating blown out highlights/blacked out regions, and the like), for example.

In step S902, the display processing circuit 113 determines whether or not the development state supplied from the control circuit 103 is a state of partially developed, and if it is determined to be the state of partially developed, executes step S904, and if not, executes step S903.

In step S904, the display processing circuit 113 generates display image data based on image data that has been subjected to developing processing by the developing circuit 112, and recorded in the recording medium 117, and partial image data that is the result of developing processing performed on the partial RAW data by the developing circuit 123 of the external apparatus 102.

Specifically, the display processing circuit 113 generates a synthetic image in which the image data of a partial area corresponding to the RAW data transmitted to the external apparatus 102, out of the entire image data of the entire captured image obtained by the developing circuit 112 performing developing processing, is replaced by the partial image data that has been received from the external apparatus 102. Also, the display processing circuit 113 generates display image data suitable for display by the display apparatus 105 based on this synthetic image, and ends the display image data generation processing. The display image data can be generated similarly to step S905 except that the original image is different.

In step S903, the display processing circuit 113 generates display image data suitable for display to be performed by the display apparatus 105 based on image data that has been subjected to developing processing by the developing circuit 112 and is recorded in the recording medium 117, and ends the display image data generation processing. The display image data can be generated similarly to step S905 except that the original image is different.

When the display image data is generated as described above, in step S804, the display processing circuit 113 generates an indicator indicating the development state, as additional auxiliary information to the display image data. The details of the operations to generate the indicator will be described using a flowchart shown in FIG. 10.

In step S1001, the display processing circuit 113 determines whether or not the development state supplied from the control circuit 103 is a state of totally developed, and if it is determined to be the state of totally developed, ends the processing for generating the indicator, and if not, executes step S1002.

In step S1002, the display processing circuit 113 obtains area information from a metadata area of the image data file to be displayed. The image data from which area information is obtained may be an entire RAW data file or a partial image data file.

In step S1003, the display processing circuit 113 generates an indicator (e.g., a frame-shaped image indicating perimeters of the partial area) indicating a partial area corresponding to the partial RAW data based on the obtained area information. The display processing circuit 113 determines the position and size of the indicator based on the image coordinate system of the display image data generated in step S803.

In step S1004, the display processing circuit 113 determines whether or not the development state supplied from the control circuit 103 is a state of partially developed, and if it is determined to be the state of partially developed, executes step S1008, and if not, executes step S1005.

In step S1008, the display processing circuit 113 determines that the indicator color is green, and ends the processing for generating the indicator.

In step S1005, the display processing circuit 113 determines whether or not the development state supplied from the control circuit 103 is a state of developing, and if it is determined to be in the state of developing, executes step S1007, and if not, executes step S1006.

In step S1006, the display processing circuit 113 determines that the indicator color is red, and ends the processing for generating the indicator.

In step S1007, the display processing circuit 113 determines that the indicator color is yellow, and ends the processing for generating the indicator.

In this way, in the present embodiment, when image data is displayed after shooting, an indicator indicating the progress status of developing processing in the external apparatus 102 with respect to the displayed image data is also displayed. Therefore, the user can easily understand the development progress status in the external apparatus regarding the image data regarding which the user has made a playback instruction. Note that, here, the status of developing processing is represented by the color of the indicator, but any different appearances, not limited to the color, can be used.

Also, here, the indicator indicating the progress status of the developing processing also functions as an indicator indicating the partial area corresponding to the partial RAW data that is firstly subjected to developing processing in the external apparatus 102. Therefore, if the indicator of the state of partially developed is displayed, in particular, the user can estimate the image quality of the remaining regions after development based on the image quality of the area inside the indicator.

Note that, here, the indicator is not displayed for image data regarding which the development state is the state of totally developed, but an indicator indicating the state of totally developed may be displayed. Also, an indicator indicating the progress status of developing processing in the external apparatus 102 may be displayed separately from the indicator indicating the partial area. An indicator in any form can be generated as far as the partial area corresponding to the partial RAW data that is firstly subjected to developing processing in the external apparatus 102 and the progress status of the developing processing in the external apparatus 102 can be understood.

Returning to FIG. 8, in step S805, the display processing circuit 113 synthesizes the indicator generated in step S804 to the display image data generated in step S803, and displays the synthesized image in the display apparatus 105. Thereafter, the display processing circuit 113 again executes step S801, and waits for an input of the next playback instruction. Then, if an instruction to change the image data to be reproduced is input, the processing in step S802 and onward is executed with respect to the new image data to be reproduced.

Figure 11:
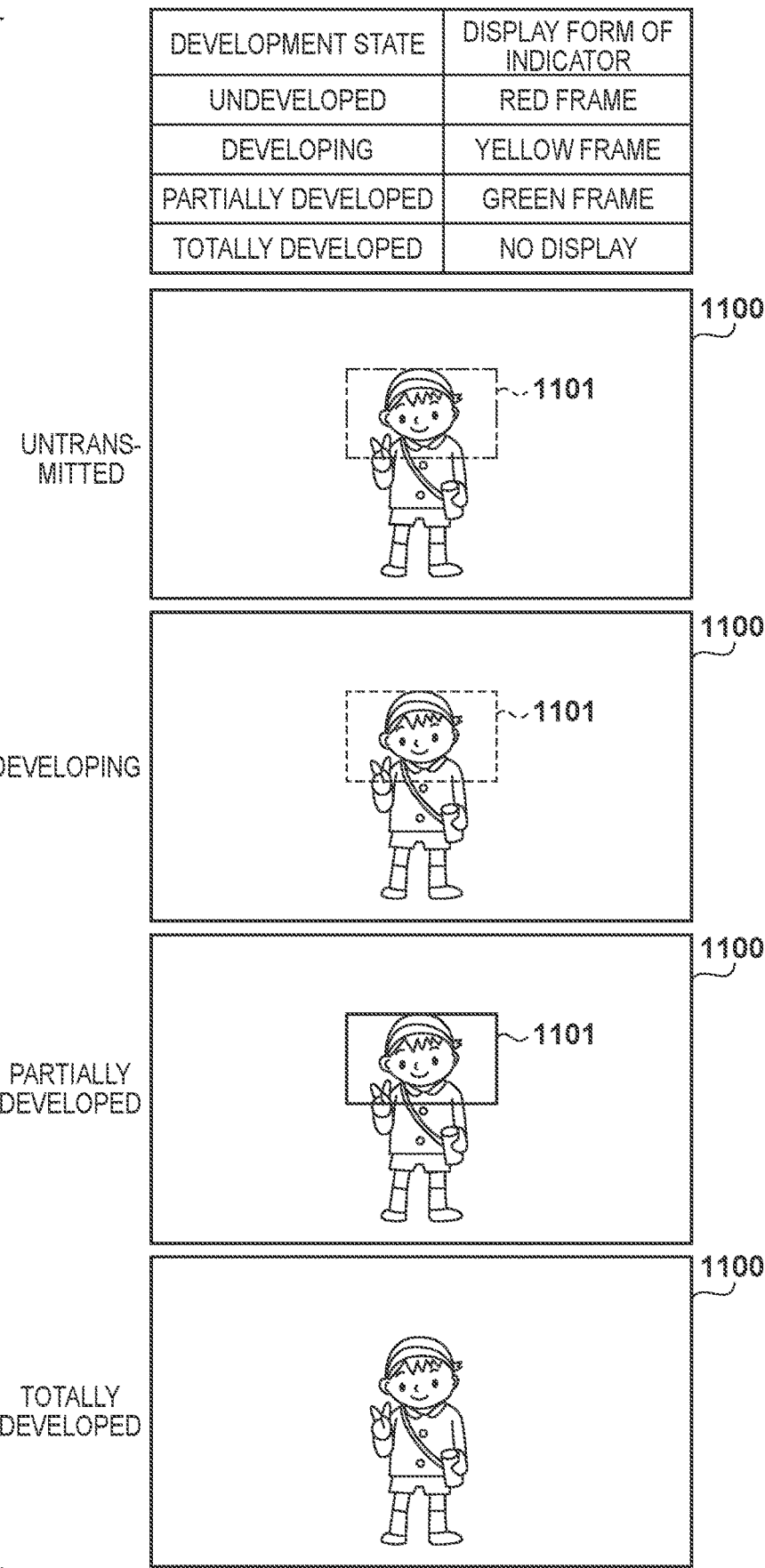
FIG. 11 is a diagram showing a display example of the index in an embodiment of the present invention.

FIG. 11 is a diagram schematically illustrating an exemplary display of a playback image in the image capture apparatus 101 that is operating in the playback mode. 1100 indicates a display screen or a display area of the display apparatus 105. An indicator 1101 indicates the partial area corresponding to partial RAW data, and the display color represents the development state in the external apparatus 102. In FIG. 11, the color of the indicator 1101 is represented by the type of line, for convenience, and in actuality, the indicator 1101 is displayed with the color stated in a table on the left. If the image data to be displayed is in the state of totally developed, the display processing circuit 113 generates the display image data based on image data in the entire image data file, and does not display the indicator.

FIG. 12 is a diagram schematically illustrating another exemplary display of the playback image in the image capture apparatus 101 that is operating in the playback mode. Here, the form of the indicator is different from the form in FIG. 11.

In this example, an indicator is used that represents the development state by brightness in the partial area corresponding to partial RAW data and in other regions. Specifically, in the state of undeveloped, the reduction in brightness in the entire image is the indicator. Note that the reduction amount in brightness is reduced in the partial area so as to be displayed brighter than the other regions. Also, in the state of partially developed, the brightness is not reduced in the partial area and only the brightness in other regions is reduced, which functions as the indicator. Also, in the state of developing, only the brightness in the partial area is seen as periodically changing by alternatingly displaying the indicator in the state of undeveloped and the indicator in the state of partially developed at fixed intervals. Also, in the state of totally developed, the indicator is not displayed, and the brightness in the entire image is not reduced. The indicators described here can be realized by changing the degree of opacity according to the region.

Note that an exemplary display has been described regarding a case where one image is displayed in the display apparatus 105, and when a plurality of images are displayed at the same time, similar display control can be performed on each image.

Figure 10:
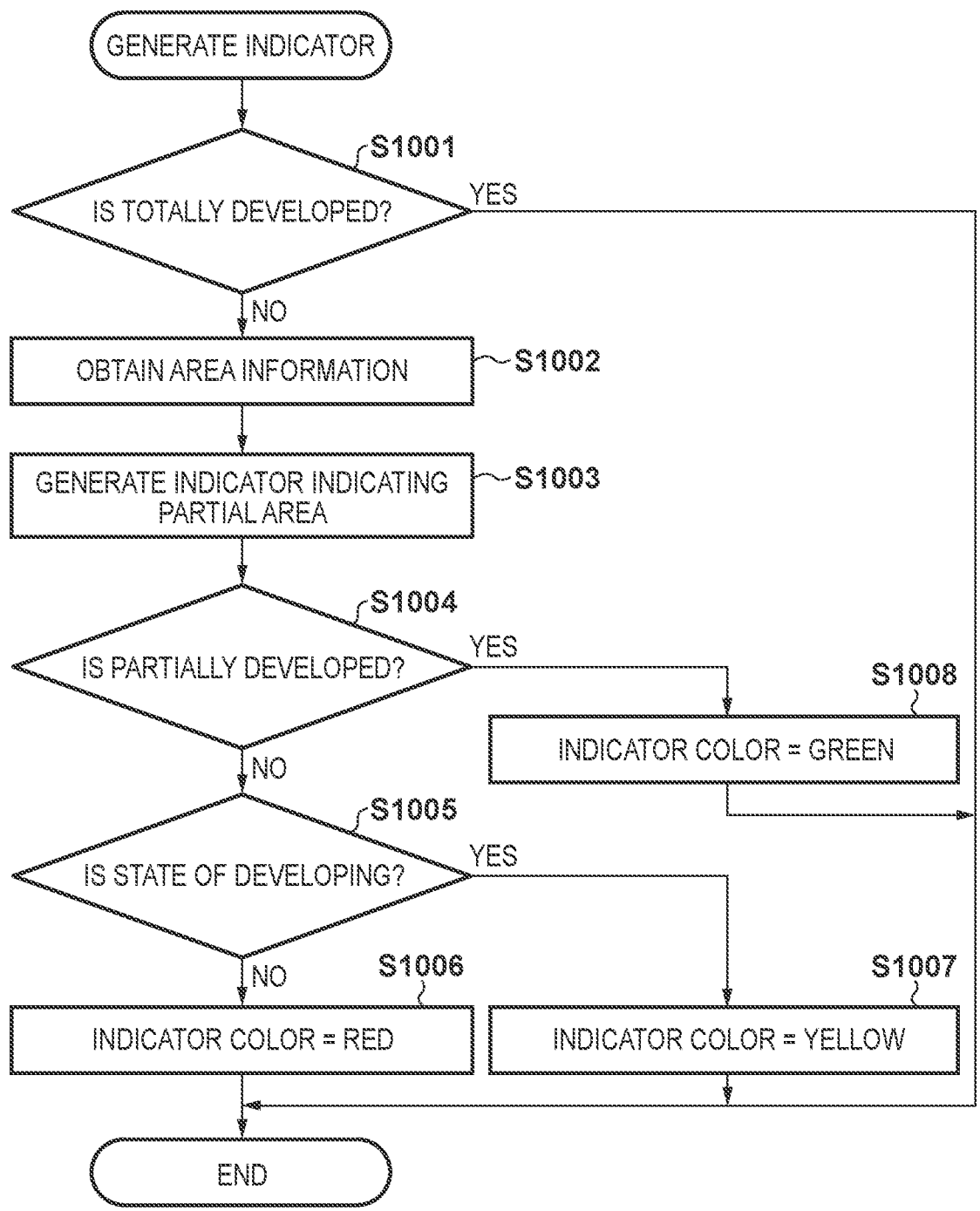
FIG. 10 is a flowchart of the details of FIG. 8.
Figure 13:
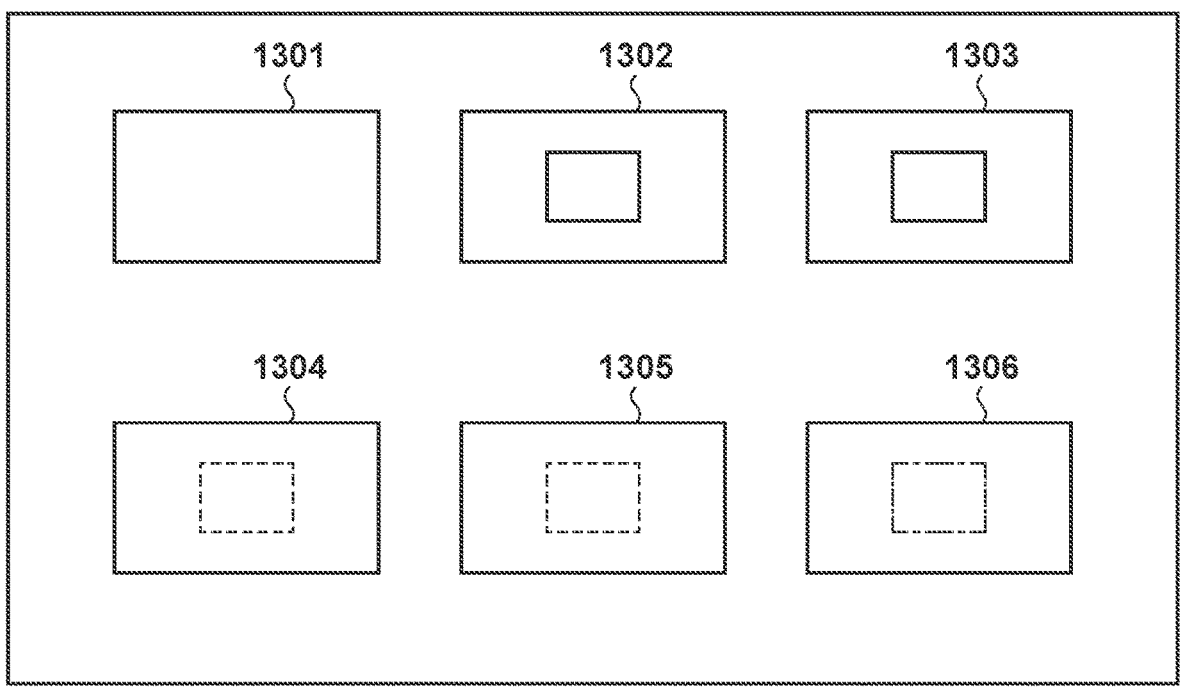
FIG. 13 is a diagram showing an example of display of an index when displaying a list in an embodiment of the present invention.

FIG. 13 schematically illustrates the state in which six images 1301 to 1306 are list-displayed in the display apparatus 105. Here, an exemplary display in which the indicators described using FIGS. 10 and 11 are applied to each image is illustrated, but indicators in another form such as the indicator shown in FIG. 12 may be used.

Note that if an enlargement instruction is input through the operation member 104 while an image is displayed, the display processing circuit 113 may perform enlargement display with the partial area being at the center. An exemplary enlargement display of an image will be described using FIGS. 14A to 14F. Here, an example of using the indicators described using FIGS. 10 and 11 is illustrated, but indicators in another form such as the indicator shown in FIG. 12 may be used.

Figure 14A:
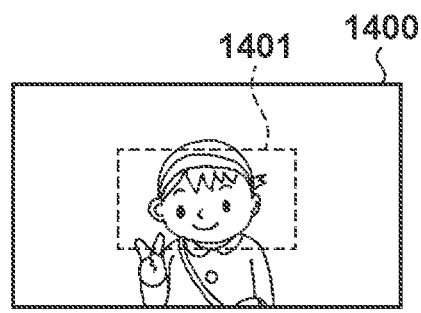
FIGS. 14A to 14F are diagrams showing display examples of indexes in enlarged display in an embodiment of the present invention.

FIG. 14A shows an exemplary display in normal magnification (no enlargement).

Figure 14B:
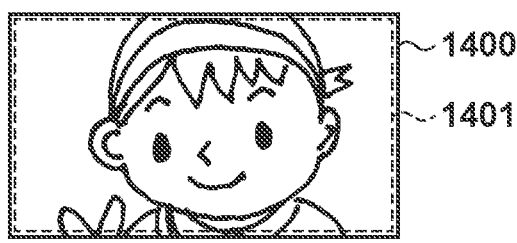

In a display screen (or a display area) 1400 of the display apparatus 105, the entire captured image is displayed along with an indicator 1401 indicating the partial area. If an enlargement instruction is input in this state, the display processing circuit 113 performs enlargement display such that the partial area is displayed in the entirety of the display screen, as shown in FIG. 14B. Here, the aspect ratios of the partial area and the display screen match, and therefore the indicator 1401 is enlargement-displayed so as to match the outer edges of the display screen.

When the development result of a partial area of an image is firstly obtained as in the present embodiment, it is envisioned that the user evaluates the quality of the developing processing by enlargement-displaying the development result regarding the partial area. Therefore, if the enlargement instruction is input regarding an image whose development state is the state of partially developed, the display processing circuit 113 determines the display magnification such that the partial area is to be displayed in the entirety of the display screen, and as a result, the user convenience can be improved.

Figure 14C:
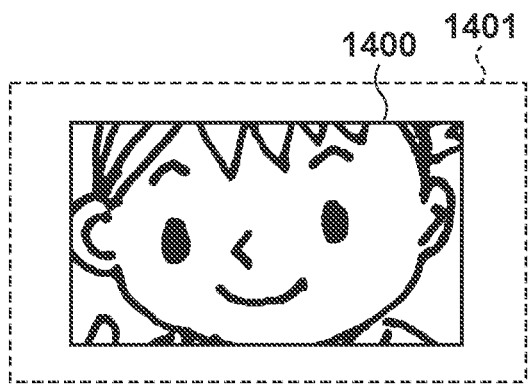

If the enlargement instruction is input in the state shown in FIG. 14B, the display processing circuit 113 may perform further enlargement display in a state in which the center of the partial area matches the center of the display screen, as shown in FIG. 14C. However, if the enlargement ratio is changed or the enlarged image is moved by the user instruction, a part or the entirety of the indicator 1401 may not be displayed.

In such a case, the user cannot understand which of a region inside the partial area and a region outside the partial area the image being displayed is related to. Also, if the indicator is not displayed, the user cannot understand the development state. Therefore, if the indicator moves out of the display screen, the entirety of the partial area cannot be displayed within the display screen, or the partial area extends beyond the display screen, the indicator may be displayed at the outer edge of the display screen.

Figure 14D:
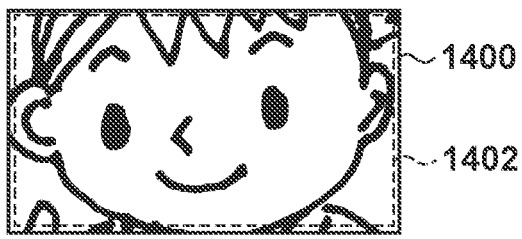

FIG. 14D shows an example of displaying the indicator 1401 that is not originally displayed, in the display at the same enlargement ratio as in FIG. 14C, as a new indicator 1402 at the outer edge of the display screen. Note that when an indicator indicating the progress status of development is used separately from the indicator indicating the perimeter of a partial area, the indicator indicating the progress status of development need only be displayed regardless of the enlargement ratio.

Figure 14E:
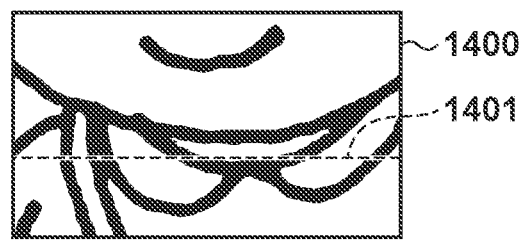

FIG. 14E shows an example of enlargement display when the center of the enlargement display is different from the center of a partial area. In this case, a part of the indicator 1401 is displayed, but which side of the indicator 1401 is the partial area cannot be recognized. When a part of the indicator is displayed, in this way, the indicator may be displayed at the outer edge of the display screen so as to indicate the position of the partial area.

Figure 14F:
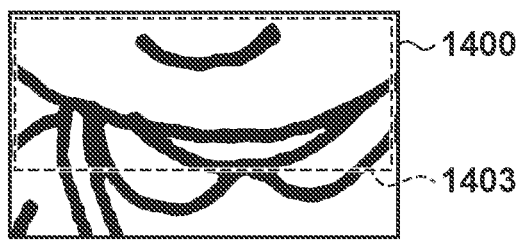

FIG. 14F shows an example of displaying an indicator 1403 so as to indicate the position of a partial area in the state shown in FIG. 14E.

In the present embodiment, in an image processing apparatus that can use an external apparatus for performing developing processing on RAW data, first, a developing processing result regarding a partial area of a captured image is obtained. Therefore, the developing processing result can be evaluated in a shorter period of time than the period needed to complete developing processing regarding the entire region.

Also, if a display instruction is made regarding an image with respect to which developing processing is not completed regarding the entire image in an external apparatus, the image processing apparatus, in addition to performing display using an image subjected to developing processing, shows an indicator indicating the progress status of the developing processing in the external apparatus. Therefore, the user can easily understand the progress status of the developing processing regarding the image being displayed. Also, as a result of displaying an indicator indicating a partial area regarding which the development result is firstly obtained in the display image in a superimposed manner, even in a state in which the developing processing regarding the entire image is not completed, the user can evaluate the developing processing result regarding the entire image from the development result regarding the partial area. Therefore, if the invention is implemented in an image capture apparatus, the developing processing result regarding a captured image can be evaluated in a short time after shooting.

Note that, in the present embodiment, when a shot image is displayed, regarding an image region with respect to which the result of developing processing performed in the external apparatus has been received, the image date obtained by performing developing processing in the external apparatus is preferentially displayed. However, a configuration may be adopted in which the result of developing processing performed in the external apparatus and the result of developing processing performed in the image processing apparatus are displayed such that comparison therebetween can be made.

Second Embodiment

Next, a second embodiment will be described. In the first embodiment, the configuration is such that an image capture apparatus determines a partial area for firstly obtaining a development result, and transmits partial RAW data corresponding to the partial area to an external apparatus. In the present embodiment, although an image capture apparatus determines a partial area, an external apparatus performs operations for extracting partial RAW data from entire RAW data.

Figure 15:
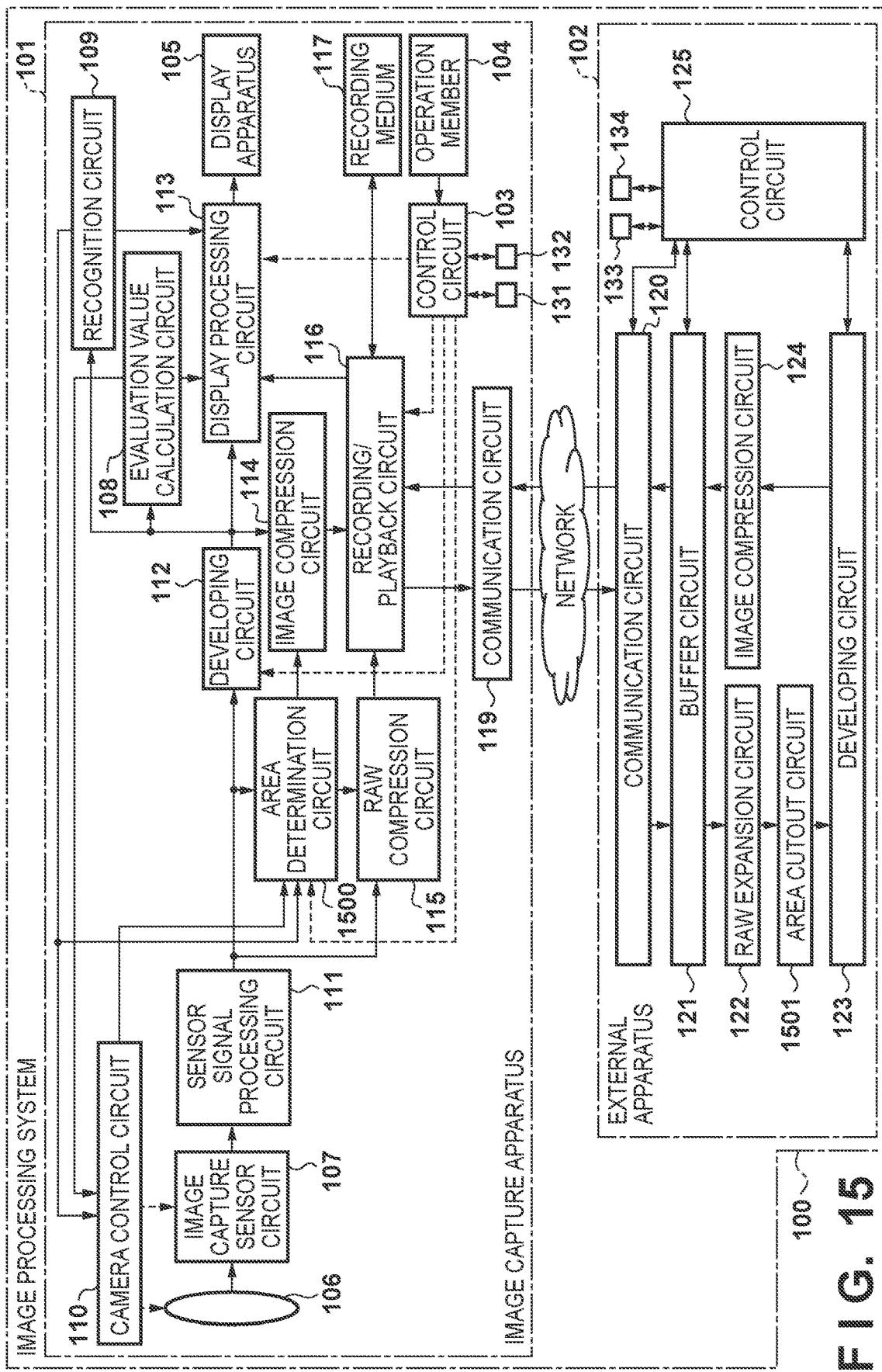
FIG. 15 is a block diagram showing a functional configuration example of the image processing system according to the second embodiment of the present invention.

FIG. 15 is a block diagram illustrating an exemplary functional configuration of an image processing system in the second embodiment. Constituent elements similar to those in the first embodiment are given the reference numerals that are same as those in FIG. 1, and redundant description will be omitted. In the present embodiment, an external apparatus 102 includes an area cutout circuit 1501.

An area determination circuit 1500 of an image capture apparatus 101 performs operations similar to those of the area determination circuit 118 in the first embodiment except that the area determination circuit 1500 does not extract partial RAW data from entire RAW data, and outputs only the information (area information) regarding a determined partial area to a RAW compression circuit 115. Also, the RAW compression circuit 115 generates only the entire RAW data file. A recording/playback circuit 116 transmits only the entire RAW data file to the external apparatus 102.

In the external apparatus 102, the entire RAW data output from a RAW expansion circuit 122 is supplied to the area cutout circuit 1501. The area cutout circuit 1501 extracts partial RAW data from the entire RAW data by referring to area information included in a metadata area 612 of the entire RAW data file, and outputs the partial RAW data to a developing circuit 123. Thereafter (e.g., after completing developing processing of partial RAW data), the area cutout circuit 1501 outputs the entire RAW data to the developing circuit 123.

Figure 16:
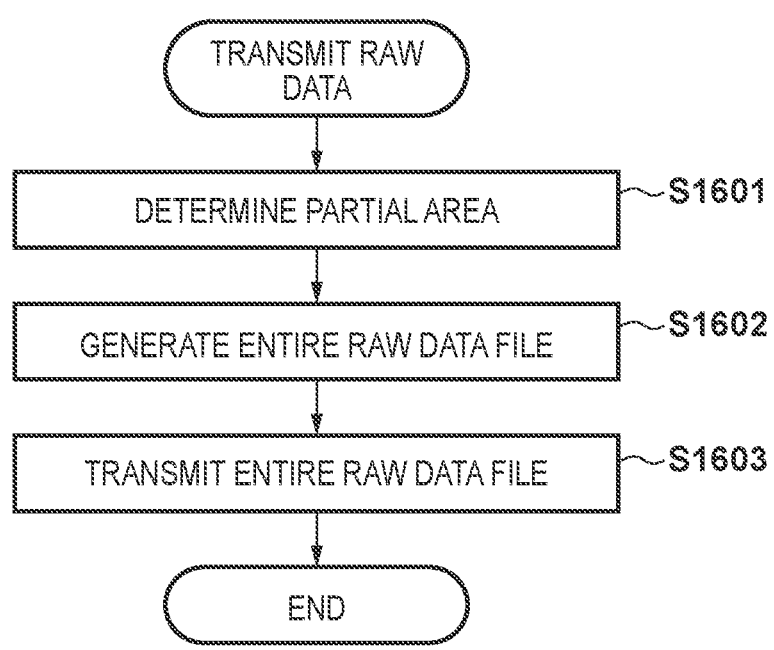
FIG. 16 is a flowchart of processing for transmitting RAW data according to the second embodiment of the present invention.

Next, the details of the transmission processing of a RAW data file in the present embodiment will be described using a flowchart in FIG. 16. This processing is performed in step S413 in the flowchart in FIG. 4.

Figure 5:
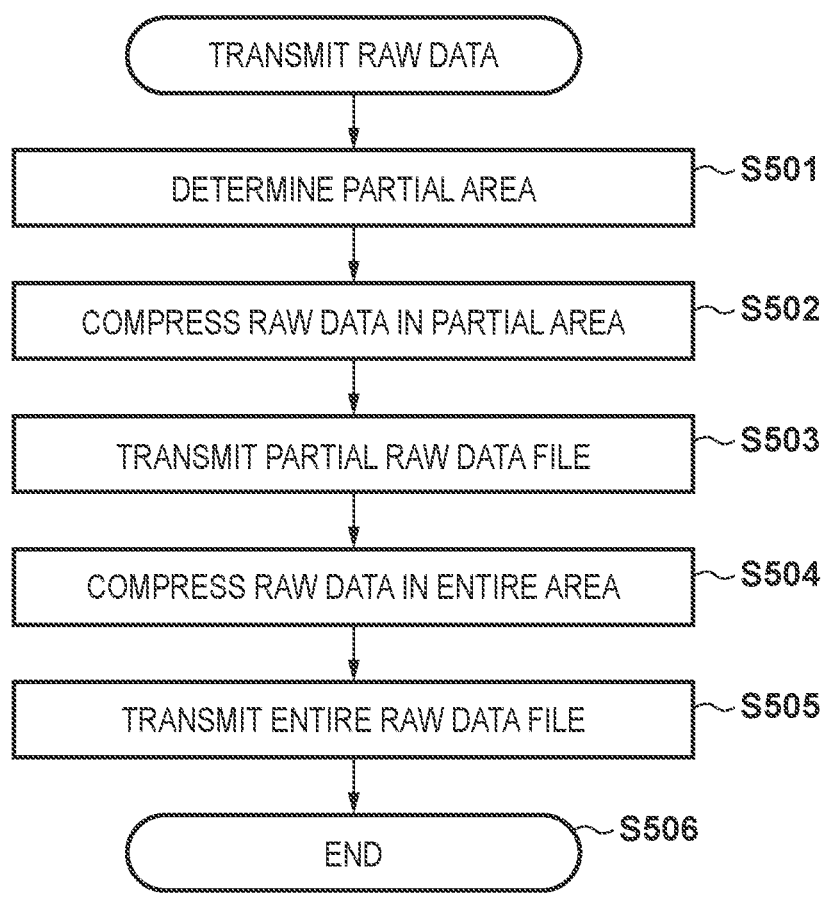
FIG. 5 is a flowchart of processing for transmitting RAW data according to the first embodiment of the present invention.

In step S1601, the area determination circuit 1500 determines the partial area to be transmitted to the external apparatus 102, similarly to the first embodiment (step S501 in FIG. 5). The method of determining the partial area may be similar to that in the first embodiment. The area determination circuit 1500 outputs information (area information) regarding the determined partial area to the RAW compression circuit 115.

In step S1602, the RAW compression circuit 115 generates an entire RAW data file in which the area information from the area determination circuit 1500 is included in the metadata area 612. Here, the RAW data may be encoded or not encoded.

In step S1603, the recording/playback circuit 116 transmits the entire RAW data file to the external apparatus 102 via a communication circuit 119.

The external apparatus 102 transmits the partial image data file and the entire image data file to the image capture apparatus 101 in this order, similarly to the first embodiment. The operations of the image capture apparatus 101 when having received these image data files from the external apparatus 102 may be similar to those in the first embodiment.

In the present embodiment, the total amount of RAW data to be transmitted to the external apparatus and the number of transmissions can be reduced, and therefore, it is advantageous when the network is charged according to the data amount. On the other hand, it is possible that the period of time until the external apparatus 102 starts developing processing of partial RAW data increases relative to the first embodiment.

Third Embodiment

Next, a third embodiment will be described. In the third embodiment, an external apparatus performs both operations of determining the partial area and extracting partial RAW data from entire RAW data.

Figure 17:
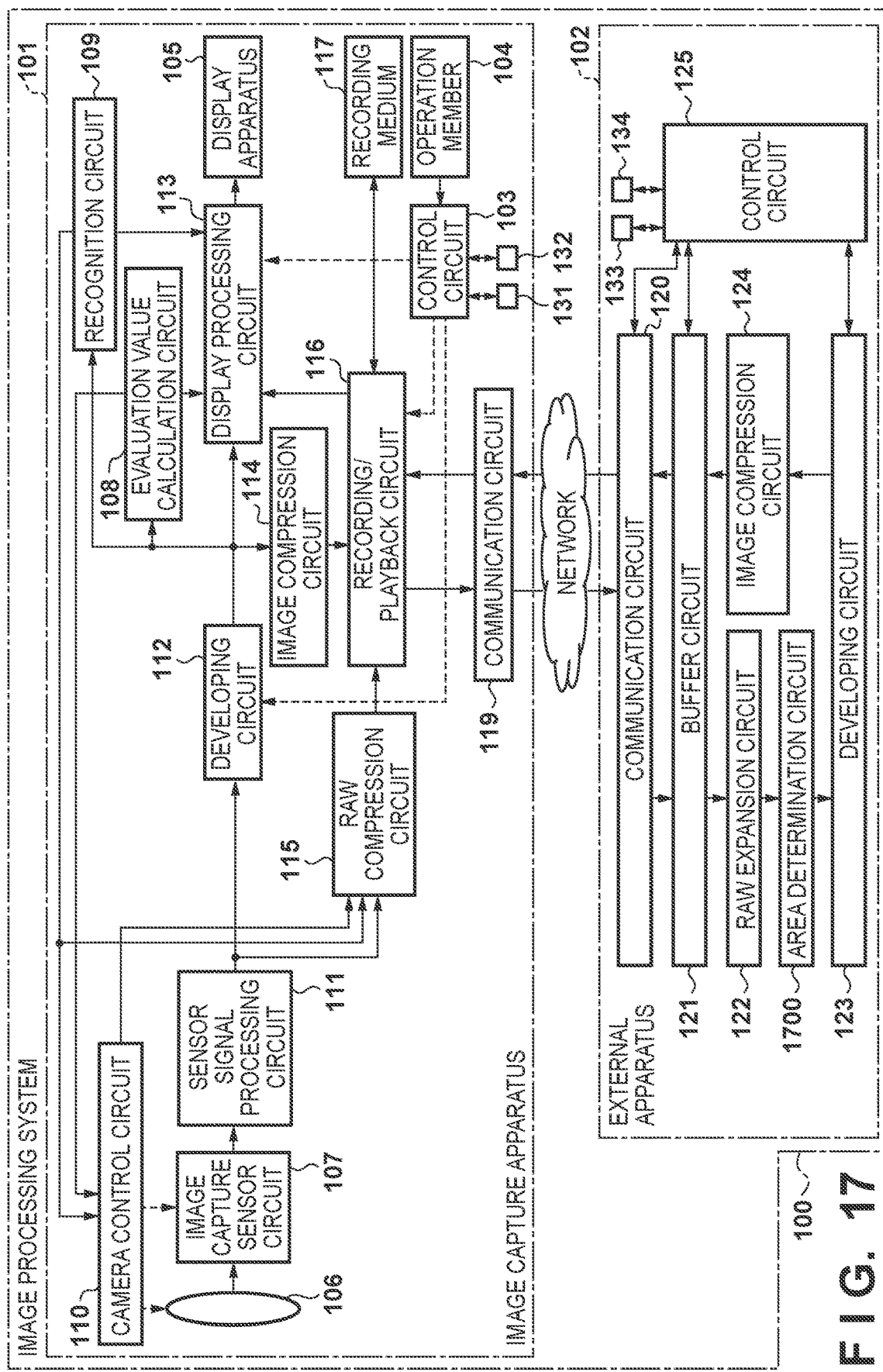
FIG. 17 is a block diagram showing a functional configuration example of the image processing system according to the third embodiment of the present invention.

FIG. 17 is a block diagram illustrating an exemplary functional configuration of an image processing system in the third embodiment. Constituent elements similar to those in the first embodiment are given the reference numerals that are same as those in FIG. 1, and redundant description will be omitted. In the present embodiment, an image capture apparatus 101 does not include the area determination circuit 118, whereas an external apparatus 102 includes an area determination circuit 1700.

In the image capture apparatus 101, a RAW compression circuit 115 generates only the entire RAW data file. The area information is not included in a metadata area 612 of the entire RAW data file to be generated. A recording/playback circuit 116 transmits only the entire RAW data file to the external apparatus 102.

In the external apparatus 102, the entire RAW data output from the RAW expansion circuit 122 is supplied to the area determination circuit 1700. The area determination circuit 1700 determines the partial area based on a shooting metadata 616 included in the metadata area 612 of the entire RAW data file. The area determination circuit 1700 can determine the partial area using pieces of information such as a focus detection area used at the time of shooting and recognized subject area. The area determination circuit 1700 extracts partial RAW data from the entire RAW data based on the determined partial area, and outputs the partial RAW data to a developing circuit 123. Thereafter (e.g., after completing developing processing of partial RAW data), the area determination circuit 1700 outputs the entire RAW data to the developing circuit 123.

In the present embodiment, in addition to the effects of the second embodiment, a configuration for determining the partial area need not be provided in the image processing apparatus, and therefore it is appropriate for the configuration in which an image capture apparatus is used as the image processing apparatus.

Fourth Embodiment

Next, a fourth embodiment will be described. In the fourth embodiment, a configuration for enabling control regarding whether or not developing processing is to be performed on entire RAW data based on partial image data is included. The present embodiment can be implemented in an image processing system including configurations similar to those of the first embodiment.

In the present embodiment, in the transmission processing of the RAW data file in step S413 in FIG. 4, the processing until transmission of a partial RAW data file (steps S501 to S503) is performed. Therefore, in the shooting mode, the entire RAW data file is not automatically transmitted to an external apparatus 102.

Also, if the development state of the image data is a state of partially developed while operating in the playback mode, the image capture apparatus 101 inquires of a user whether or not developing processing will be performed in the external apparatus 102 regarding the entire image. If the user makes an instruction to perform the developing processing in the external apparatus 102 regarding the entire image, the entire RAW data file corresponding to the image data being displayed is transmitted to the external apparatus 102.

Figure 18A:
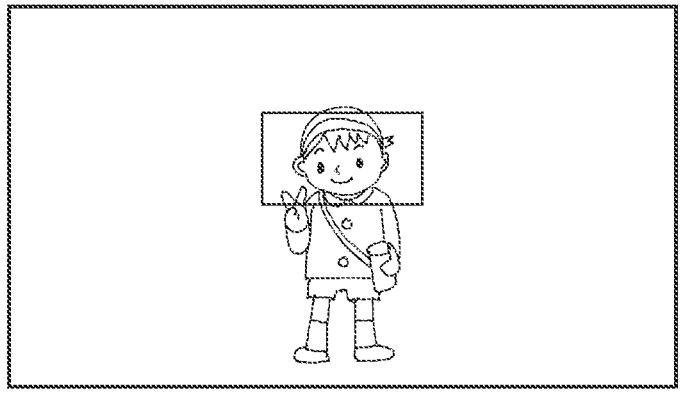
FIGS. 18A to 18C are diagrams showing display examples in the image capture apparatus according to the fourth embodiment of the present invention.
Figure 19:
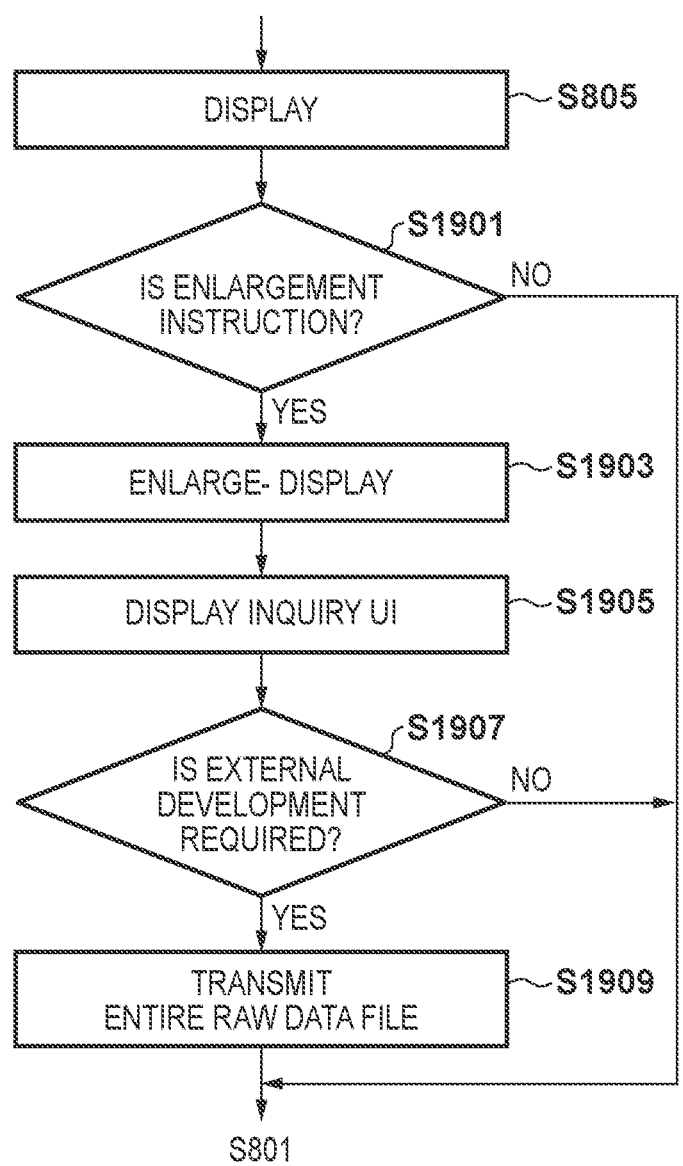
FIG. 19 is a flowchart of the operation in the playback mode of the image capture apparatus according to the fourth embodiment of the present invention.

FIG. 18A is a diagram schematically illustrating the state in which the image capture apparatus 101 that is operating in the playback mode displays a shot image in a display apparatus 105, in the present embodiment. Here, it is assumed that the development state of the image data being displayed is a state of partially developed. The operation of generating display image data is as described in the first embodiment. Also, FIG. 19 is a flowchart regarding the operations of the image capture apparatus 101 that is operating in the playback mode, in the present embodiment. In FIG. 19, description of steps S801 to S804 shown in FIG. 8 is omitted.

Figure 18B:
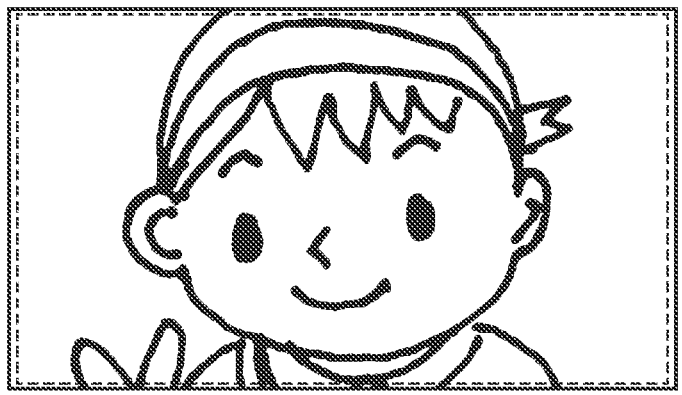
Figure 18C:

For example, if an enlargement instruction is input in a display state shown in FIG. 18A (Yes in step S1901), a display processing circuit 113 performs enlargement display as described using FIGS. 14A to 14F (FIG. 18B, step S1903). Moreover, the display processing circuit 113 displays a user interface 1801 in the enlarged image in a superimposed manner for inquiring of the user whether or not the developing processing is to be executed in the external apparatus 102 regarding the entire image (FIG. 18C, step S1905). In FIG. 18C, an example of the user interface 1801 is shown when the developing processing in the external apparatus 102 results in higher image quality than the developing processing in the image capture apparatus 101.

The user can make an instruction regarding whether or not developing processing is to be performed in the external apparatus 102 regarding the entire image by selecting one of "Yes" and "No" using an arrow key, for example, of the operation member 104, and pressing down a determination key.

A control circuit 103, upon receiving an instruction to perform developing processing in the external apparatus 102 regarding the entire image from the user through the operation member 104 (Yes in step S1907), controls a RAW compression circuit 115 so as to generate an entire RAW data file. The RAW compression circuit 115 can generate the entire RAW data file based on the RAW data file that is recorded in a recording medium 117 in step S412. Also, a recording/playback circuit 116 transmits the entire RAW data file to the external apparatus 102 (step S1909). Thereafter, upon receiving the entire image data file from the external apparatus, the recording/playback circuit 116 records the entire image data file in the recording medium 117.

In the present embodiment, the external apparatus 102 is requested to perform the developing processing of the entire image regarding only the image that is determined to be needed by the user, and therefore the amount of communication with the external apparatus 102 can further be reduced than those of the second and third embodiments.

Note that, here, a configuration has been described in which a user is inquired whether or not the developing processing of an entire image is to be performed in an external apparatus regarding only the image with respect to which the user made an instruction to perform enlargement display. However, the configuration may be such that, if the development state of image data to be displayed is a state of partially developed, inquiry is made automatically. For example, in the operation in the playback mode shown in FIG. 19, in step S1901, the display processing circuit 113 determines whether or not the development state of image data to be displayed is the state of partially developed. Then, if it is determined that the development state of the image data to be displayed is the state of partially developed, the display processing circuit 113 may execute step S1903 and onward. That is, as shown in FIG. 18C, a partial area is automatically enlarge-displayed in the display apparatus 105, and moreover the user interface 1801 can be displayed in a superimposed manner. The operations thereafter are as described in FIG. 19.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-19132, filed on Feb. 6, 2020, which is hereby incorporated by reference herein in its entirety.

What is claimed is:

1. An image processing apparatus comprising:
an obtaining circuit that obtains RAW image data;
a transmission circuit that transmits the RAW image data to an external apparatus;
an image processing circuit that applies first image processing to the RAW image data;
a reception circuit that receives a result of second image processing applied in the external apparatus to a part of the RAW image data corresponding to a partial area of an entire image represented by the RAW image data, prior to receiving a result of the second image processing applied in the external apparatus to the entirety of the RAW image data corresponding to the entire image; and
a display control circuit that controls display in a display apparatus,
wherein the display control circuit, when causing the display apparatus to display the RAW image data that has been transmitted to the external apparatus, causes the display apparatus to display the RAW image data along with an indicator indicating a status of the second image processing being applied to the RAW image data in the external apparatus, and
wherein the transmission circuit first transmits the part of the RAW image data to the external apparatus and then transmits the entirety of the RAW image data to the external apparatus.

2. The image processing apparatus according to claim 1, wherein the transmission circuit transmits the entirety of the RAW image data to the external apparatus if an instruction from a user is received after transmitting the part of the RAW image data to the external apparatus.

3. The image processing apparatus according to claim 1, further comprising a determination circuit that determines the partial area.

4. The image processing apparatus according to claim 1, wherein the indicator also indicates a perimeter of the partial area.

5. The image processing apparatus according to claim 1, wherein the indicator is a frame-shaped indicator indicating a perimeter of the partial area, and has an appearance according to the status of the second image processing.

6. The image processing apparatus according to claim 1, wherein the indicator represents the status of the second image processing by brightness of the partial area and brightness of other areas of the displayed image.

7. The image processing apparatus according to claim 1, wherein the first image processing and the second image processing are each developing processing.

8. The image processing apparatus according to claim 1, wherein the display control circuit, when causing the display apparatus to perform enlargement display of the RAW image data, causes the display apparatus to perform enlargement display with the partial area being the center.

9. The image processing apparatus according to claim 1,
wherein the indicator also indicates a perimeter of the partial area, and
the display control circuit, when causing the display apparatus to perform enlargement display of the RAW image data, causes the display circuit to display the indicator at an edge of a display area if the entirety of the partial area cannot be displayed within the display area.

10. An image processing method comprising:
obtaining RAW image data;
transmitting the RAW image data to an external apparatus;
applying first image processing to the RAW image data;
receiving a result of second image processing applied in the external apparatus to a part of the RAW image data corresponding to a partial area of an entire image represented by the RAW image data, prior to receiving a result of the second image processing applied in the external apparatus to the entirety of the RAW image data corresponding to the entire image; and
controlling a display apparatus,
wherein the controlling comprises causing the display apparatus to display the RAW image data that has been transmitted to the external apparatus,
wherein the causing causes the display apparatus to display the RAW image data along with an indicator indicating a status of the second image processing being applied to the RAW image data in the external apparatus, and
wherein the transmitting first transmits the part of the RAW image data to the external apparatus and then transmits the entirety of the RAW image data to the external apparatus.

11. A non-transitory machine-readable medium storing a program for causing a computer to function as an image processing apparatus comprising:
an obtaining unit configured to obtain RAW image data;
a transmission unit configured to transmit the RAW image data to an external apparatus;
an image processing unit configured to apply first image processing to the RAW image data;
a reception unit configured to receive a result of second image processing applied in the external apparatus to a part of the RAW image data corresponding to a partial area of an entire image represented by the RAW image data, prior to receiving a result of the second image processing applied in the external apparatus to the entirety of the RAW image data corresponding to the entire image; and
a display control unit configured to control display in a display apparatus,
wherein the display control unit, when causing the display apparatus to display the RAW image data that has been transmitted to the external apparatus, causes the display apparatus to display the RAW image data along with an indicator indicating a status of the second image processing being applied to the RAW image data in the external apparatus, and wherein the transmission unit first transmits the part of the RAW image data to the external apparatus and then transmits the entirety of the image data to the external apparatus.

12. An image processing apparatus comprising:

an obtaining circuit that obtains image data;

a transmission circuit that transmits the image data to an external apparatus;

an image processing circuit that applies first image processing to the image data;

a reception circuit that receives a result of second image processing applied in the external apparatus to a part of the image data corresponding to a partial area of an entire image represented by the image data, prior to receiving a result of the second image processing applied in the external apparatus to the entirety of the image data corresponding to the entire image; and a display control circuit that controls display in a display apparatus, wherein the display control circuit, when causing the display apparatus to display the image data that has been transmitted to the external apparatus, causes the display apparatus to display the image data along with an indicator indicating a status of the second image processing being applied to the image data in the external apparatus, and wherein the indicator is a frame-shaped indicator indicating a perimeter of the partial area, and has an appearance according to the status of the second image processing.

13. An image processing apparatus comprising:

an obtaining circuit that obtains image data;

a transmission circuit that transmits the image data to an external apparatus;

an image processing circuit that applies first image processing to the image data;

a reception circuit that receives a result of second image processing applied in the external apparatus to a part of the image data corresponding to a partial area of an entire image represented by the image data, prior to receiving a result of the second image processing applied in the external apparatus to the entirety of the image data corresponding to the entire image; and a display control circuit that controls display in a display apparatus, wherein the display control circuit, when causing the display apparatus to display the image data that has been transmitted to the external apparatus, causes the display apparatus to display the image data along with an indicator indicating a status of the second image processing being applied to the image data in the external apparatus, and wherein the display control circuit, when causing the display apparatus to perform enlargement display of the image data, causes the display apparatus to perform enlargement display with the partial area being the center.

14. An image processing apparatus comprising:

an obtaining circuit that obtains image data;

a transmission circuit that transmits the image data to an external apparatus;

an image processing circuit that applies first image processing to the image data;

a reception circuit that receives a result of second image processing applied in the external apparatus to a part of the image data corresponding to a partial area of an entire image represented by the image data, prior to receiving a result of the second image processing applied in the external apparatus to the entirety of the image data corresponding to the entire image; and a display control circuit that controls display in a display apparatus, wherein the display control circuit, when causing the display apparatus to display the image data that has been transmitted to the external apparatus, causes the display apparatus to display the image data along with an indicator indicating a status of the second image processing being applied to the image data in the external apparatus, wherein the indicator also indicates a perimeter of the partial area, and the display control circuit, when causing the display apparatus to perform enlargement display of the image data, causes the display circuit to display the indicator at an edge of a display area if the entirety of the partial area cannot be displayed within the display area.

* * * * *